United States Patent
Ryan

(10) Patent No.: US 9,311,786 B2
(45) Date of Patent: Apr. 12, 2016

(54) ELECTRONIC GAMING DEVICE WITH PLATFORM GAMING FUNCTIONALITY

(71) Applicant: Cadillac Jack Inc., Duluth, GA (US)

(72) Inventor: Timothy Curtis Ryan, Duluth, GA (US)

(73) Assignee: Cadillac Jack, Inc., Duluth, GA (US)

( * ) Notice: Subject to any disclaimer, the term of this patent is extended or adjusted under 35 U.S.C. 154(b) by 119 days.

(21) Appl. No.: 13/750,973

(22) Filed: Jan. 25, 2013

(65) Prior Publication Data

US 2014/0162750 A1    Jun. 12, 2014

Related U.S. Application Data

(63) Continuation of application No. 13/712,903, filed on Dec. 12, 2012.

(51) Int. Cl.
| | |
|---|---|
| A63F 9/24 | (2006.01) |
| A63F 13/00 | (2014.01) |
| G07F 17/34 | (2006.01) |
| G07F 17/32 | (2006.01) |
| A63F 13/40 | (2014.01) |
| A63F 13/80 | (2014.01) |

(52) U.S. Cl.
CPC ............... *G07F 17/34* (2013.01); *A63F 13/10* (2013.01); *A63F 13/80* (2014.09); *G07F 17/326* (2013.01); *G07F 17/3262* (2013.01); *G07F 17/3267* (2013.01)

(58) Field of Classification Search
CPC .. G07F 17/32; G07F 17/3262; G07F 17/3267
See application file for complete search history.

(56) References Cited

U.S. PATENT DOCUMENTS

| | | | | |
|---|---|---|---|---|
| 6,290,600 | B1 * | 9/2001 | Glasson | 463/20 |
| 6,364,766 | B1 * | 4/2002 | Anderson et al. | 463/16 |
| 6,517,432 | B1 * | 2/2003 | Jaffe | 463/16 |
| 6,554,704 | B2 * | 4/2003 | Nicastro et al. | 463/20 |
| 6,565,433 | B1 * | 5/2003 | Baerlocher et al. | 463/20 |
| 6,607,437 | B2 * | 8/2003 | Casey et al. | 463/16 |
| 6,634,941 | B2 * | 10/2003 | Olive | 463/16 |
| 6,682,073 | B2 * | 1/2004 | Bryant et al. | 273/138.1 |
| 6,743,096 | B2 * | 6/2004 | Allendorf et al. | 463/25 |
| 6,746,327 | B2 * | 6/2004 | Frohm et al. | 463/16 |
| 6,767,283 | B1 * | 7/2004 | Weiss | 463/16 |
| 6,786,818 | B1 * | 9/2004 | Rothschild et al. | 463/20 |
| 6,984,174 | B2 * | 1/2006 | Cannon et al. | 463/25 |
| 7,014,559 | B1 * | 3/2006 | Fong | 463/20 |
| 7,077,745 | B2 * | 7/2006 | Gomez et al. | 463/20 |
| 7,445,547 | B2 * | 11/2008 | Suzuki | 463/16 |
| 7,803,044 | B2 * | 9/2010 | Baerlocher et al. | 463/17 |
| 8,187,079 | B2 * | 5/2012 | Gomez et al. | 463/20 |
| 8,216,061 | B2 * | 7/2012 | Pacey | 463/25 |
| 8,597,097 | B2 * | 12/2013 | Hornik et al. | 463/16 |
| RE44,833 | E * | 4/2014 | Muir et al. | 463/20 |
| 8,727,867 | B2 * | 5/2014 | Kane et al. | 463/25 |
| 2008/0085759 | A1 * | 4/2008 | Bilyeu et al. | 463/20 |
| 2011/0212766 | A1 * | 9/2011 | Bowers et al. | 463/25 |

* cited by examiner

*Primary Examiner* — Lawrence Galka
(74) *Attorney, Agent, or Firm* — Weide & Miller, Ltd.

(57) ABSTRACT

Examples disclosed herein relate to systems and methods, which may receive wagers on one or more paylines. The systems and methods may utilize one or more objects in a platform based game. The systems and methods may determine one or more payouts based on the one or more objects in a platform based game. The systems and methods may display one or more presentations based on the one or more platform results.

20 Claims, 21 Drawing Sheets

ELECTRONIC GAMING DEVICE WITH PLATFORM GAMING FUNCTIONALITY

CROSS-REFERENCE TO RELATED PATENT APPLICATION

This application is a continuation of prior application Ser. No. 13/712,903 entitled "ELECTRONIC GAMING DEVICE WITH PLATFORM GAMING FUNCTIONALITY", filed on Dec. 12, 2012, which is incorporated herein by reference in its entirety.

FIELD

The subject matter disclosed herein relates to an electronic gaming device. More specifically, the disclosure relates to an electronic gaming device, which provides game play with one or more platform functionalities. Further, the disclosure relates to utilizing platform functionality and platform based presentations in the base game and/or the bonus game to enhance the gaming experience.
Information:
The gaming industry has numerous casinos located both worldwide and in the United States. A client of a casino or other gaming entity can gamble via various games of chance. For example, craps, roulette, baccarat, blackjack, and electronic games (e.g., a slot machine) where a person may gamble on an outcome.

Paylines of an electronic gaming device (e.g., a slot machine) are utilized to determine when predetermined winning symbol combinations are aligned in a predetermined pattern to form a winning combination. A winning event occurs when the player successful matches the predetermined winning symbols in one of the predetermined patterns. One or more combinations of symbols may generate a bonus game. A new way of delivering game play includes providing platform functionality and/or platform based presentations in the base game and/or the bonus game.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
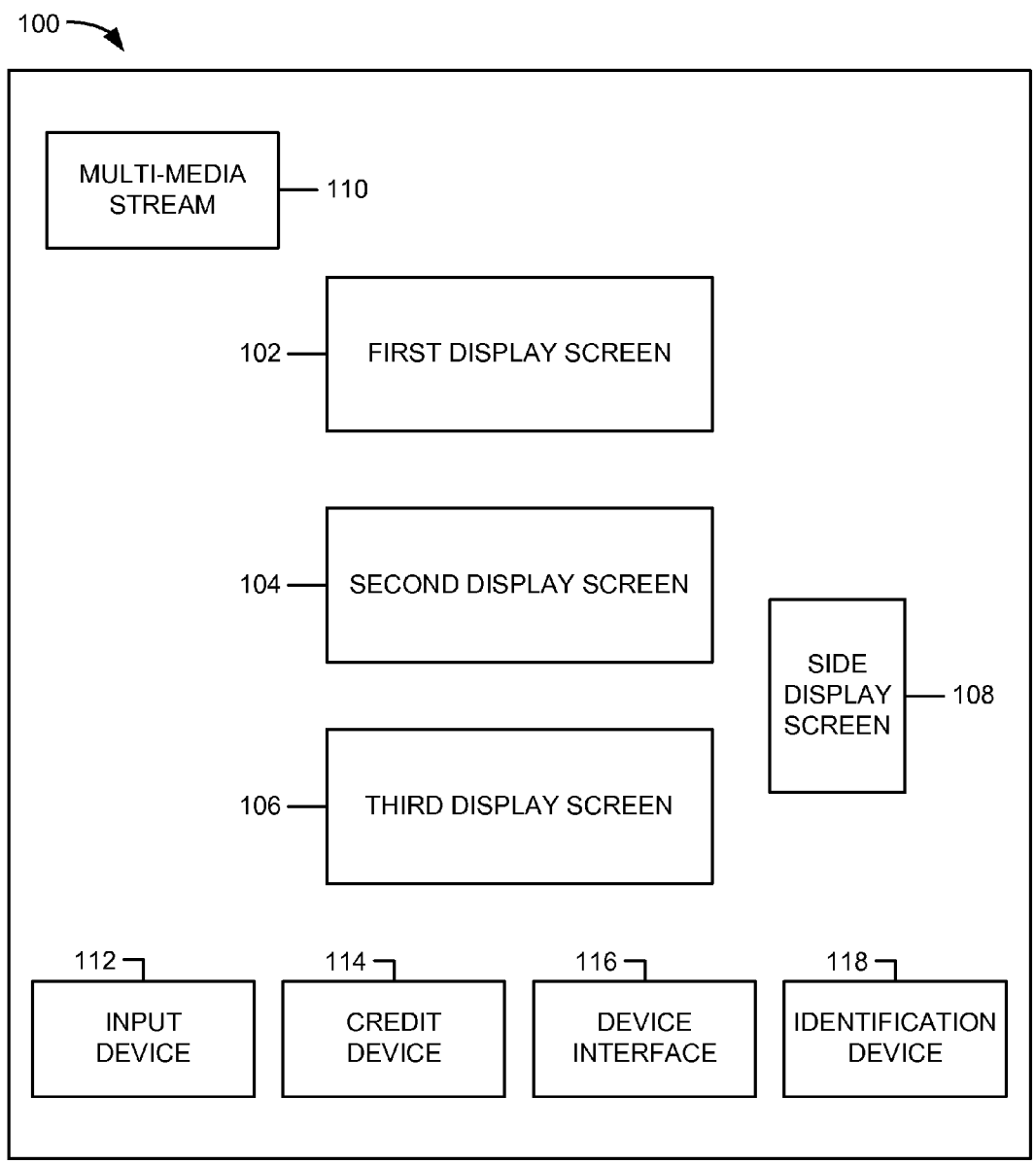
FIG. 1 is an illustration of the electronic gaming device, according to one embodiment.

FIG. 1 is an illustration of an electronic gaming device 100. Electronic gaming device 100 may include a multi-media stream 110, a first display screen 102, a second display screen 104, a third display screen 106, a side display screen 108, an input device 112, a credit device 114, a device interface 116, and an identification device 118. Electronic gaming device 100 may display one, two, a few, or a plurality of multi-media streams 110, which may be obtained from one or more gaming tables, one or more electronic gaming devices, a central server, a video server, a music server, an advertising server, another data source, and/or any combination thereof.

Multi-media streams may be obtained for an entertainment event, a wagering event, a promotional event, a promotional offering, an advertisement, a sporting event, any other event, and/or any combination thereof. For example, the entertainment event may be a concert, a show, a television program, a movie, an Internet event, and/or any combination thereof. In another example, the wagering event may be a poker tournament, a horse race, a car race, and/or any combination thereof. The advertisement may be an advertisement for a casino, a restaurant, a shop, any other entity, and/or any combination thereof. The sporting event may be a football game, a baseball game, a hockey game, a basketball game, any other sporting event, and/or any combination thereof. These multi-media streams may be utilized in combination with the gaming table video streams.

Input device 112 may be mechanical buttons, electronic buttons, mechanical switches, electronic switches, optical switches, a slot pull handle, a keyboard, a keypad, a touch screen, a gesture screen, a joystick, a pointing device (e.g., a mouse), a virtual (on-screen) keyboard, a virtual (on-screen) keypad, biometric sensor, or any combination thereof. Input device 112 may be utilized to make a wager, to control any object (e.g., a tool, a person, an image, a selection option, one or more terrain characteristics, etc.), to select one or more pattern gaming options, to obtain data relating to historical payouts, to select a row and/or column to move, to select a row area to move, to select a column area to move, to select a symbol (or image) to move, to modify electronic gaming device 100 (e.g., change sound level, configuration, font, language, etc.), to select a movie or song, to select live multi-media streams, to request services (e.g., drinks, slot attendant, manager, etc.), to select two-dimensional ("2D") game play, to select three-dimensional ("3D") game play, to select both two-dimensional and three-dimensional game play, to change the orientation of games in a three-dimensional space, to move a symbol (e.g., wild, multiplier, etc.), to select a platform object, to select a platform gaming option, to select a platform image characteristic, and/or any combination thereof. These selections may occur via any other input device (e.g., a touch screen, voice commands, etc.). Input device 112 may be any control panel.

Credit device 114 may be utilized to collect monies and distribute monies (e.g., cash, vouchers, etc.). Credit device 114 may interface with a mobile device to electronically transmit money and/or credits. Credit device 114 may interface with a player's card to exchange player points.

Device interface 116 may be utilized to interface electronic gaming device 100 to a bonus game device, a local area progressive controller, a wide area progressive controller, a progressive sign controller, a peripheral display device, signage, a promotional device, network components, a local network, a wide area network, remote access equipment, a slot monitoring system, a slot player tracking system, the Internet, a server, and/or any combination thereof.

Device interface 116 may be utilized to connect a player to electronic gaming device 100 through a mobile device, card, keypad, identification device 118, and/or any combination thereof. Device interface 116 may include a docking station by which a mobile device is plugged into electronic gaming machine 100. Device interface 116 may include an over the air connection by which a mobile device is connected to electronic gaming machine 100 (e.g., Bluetooth, Near Field technology, and/or Wi-Fi technology). Device interface 116 may include a connection to identification device 118.

Identification device 118 may be utilized to determine an identity of a player. Based on information obtained by identification device 118, electronic gaming device 100 may be reconfigured. For example, the language, sound level, music, placement of multi-media streams, one or more platform based functionalities (e.g., platform game type 1, platform game type 2, platform game type 3, etc.) may be presented, a repeat payline gaming option may be presented, a pattern gaming option may be presented, historical gaming data may be presented, a row rearrangement option may be presented, a column rearrangement option may be presented, a row area rearrangement option may be presented, a column area rearrangement option may be presented, a two-dimensional gaming option may be presented, a three-dimensional gaming option may be presented, and/or the placement of gaming options may be modified based on player preference data. For example, a player may want to have game play which has only platform based functionality (or similar functionality). Therefore, no games without platform based functionality would be presented. In another example, the player may only want to play games that include pattern gaming options only. Therefore, only games which include pattern gaming options would be presented to the player. In another example, the player may only want to play games that include historical information relating to game play. Therefore, only games which include historical gaming data would be presented to the player. These examples may be combined.

Identification device 118 may utilize biometrics (e.g., thumb print, retinal scan, or other biometric). Identification device 118 may include a card entry slot into input device 112. Identification device 118 may include a keypad with an assigned pin number for verification. Identification device 118 may include multiple layers of identification for added security. For example, a player could be required to enter a player tracking card, and/or a pin number, and/or a thumb print, and/or any combination thereof. Based on information obtained by identification device 118, electronic gaming device 100 may be reconfigured. For example, the language, sound level, music, placement of video streams, placement of images, and the placement of gaming options utilized may be modified based on a player's preference data. For example, a player may have selected baseball under the sporting event preferences; electronic gaming device 100 will then automatically display the current baseball game onto side display screen 108 and/or an alternate display screen as set in the player's options.

First display screen 102 may be a liquid crystal display ("LCD"), a cathode ray tube display ("CRT"), organic light-emitting diode display ("OLED"), plasma display panel ("PDP"), electroluminescent display ("ELD"), a light-emitting diode display ("LED"), or any other display technology. First display screen 102 may be used for displaying primary games or secondary (bonus) games, advertising, player attractions, electronic gaming device 100 configuration parameters and settings, game history, accounting meters, events, alarms, and/or any combination thereof. Second display screen 104, third display screen 106, side display screen 108, and any other screens may utilize the same technology as first display screen 102 and/or any combination of technologies.

First display screen 102 may also be virtually combined with second display screen 104. Likewise second display screen 104 may also be virtually combined with third display screen 106. First display screen 102 may be virtually combined with both second display screen 104 and third display screen 106. Any combination thereof may be formed.

The presentations associated with platform based game may be presented on one, a few, and/or a plurality of screens. These presentations associated with platform based game play may be displayed on a portion of one, a few, and/or a plurality of these screens.

For example, a single large image could be partially displayed on second display screen 104 and partially displayed on third display screen 106, so that when both display screens are put together they complete one image. Electronic gaming device 100 may stream or play prerecorded multi-media data, which may be displayed on any display combination.

Figure 2:
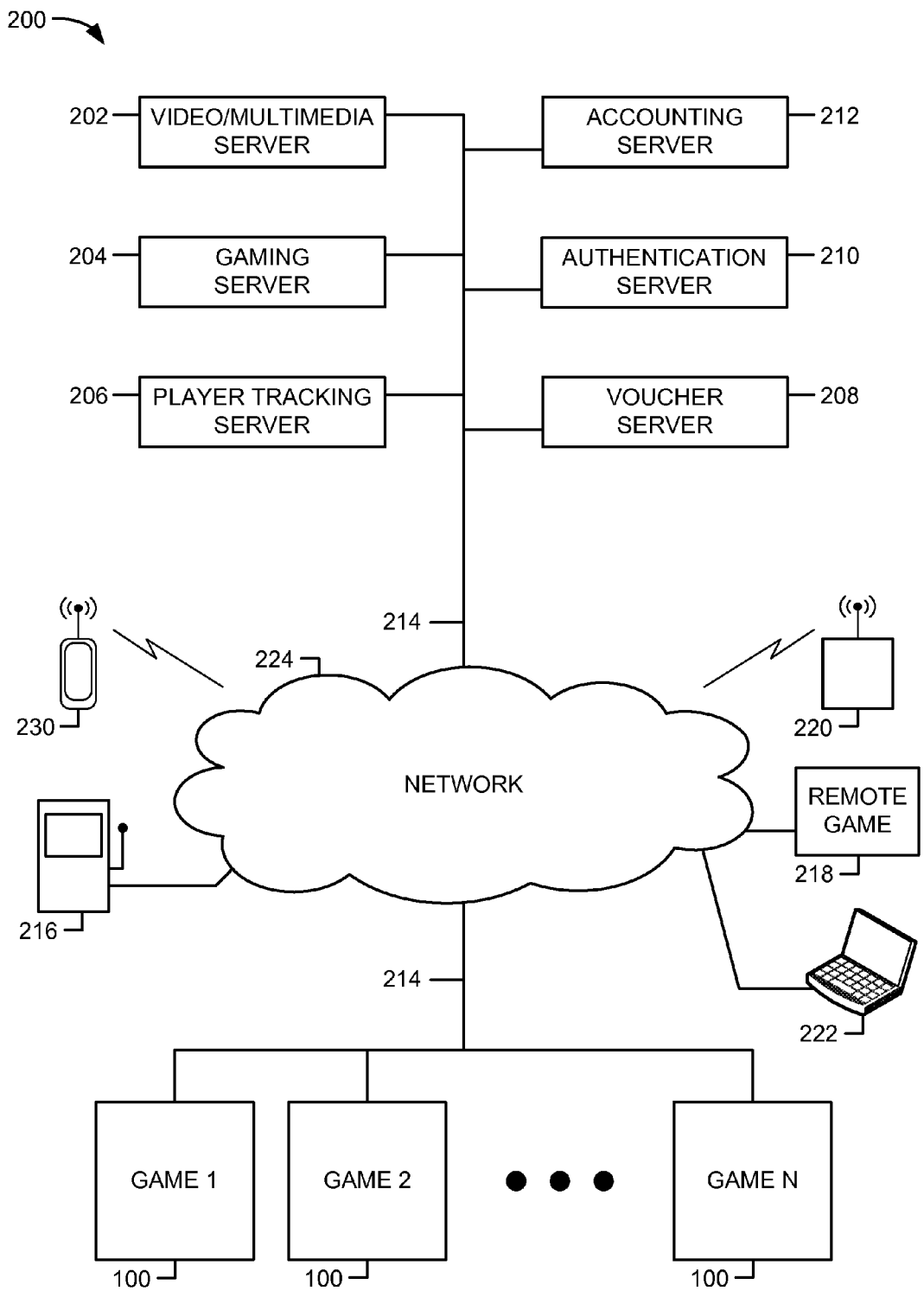
FIG. 2 is an illustration of an electronic gaming system, according to one embodiment.

In FIG. 2, an electronic gaming system 200 is shown. Electronic gaming system 200 may include a video/multimedia server 202, a gaming server 204, a player tracking server 206, a voucher server 208, an authentication server 210, and an accounting server 212.

Electronic gaming system 200 may include video/multimedia server 202, which may be coupled to network 224 via a network link 214. Network 224 may be the Internet, a private network, and/or a network cloud. One or more video streams may be received at video/multimedia server 202 from other electronic gaming devices 100. Video/multimedia server 202 may transmit one or more of these video streams to a mobile phone 230, electronic gaming device 100, a remote electronic gaming device at a different location in the same property 216, a remote electronic gaming device at a different location 218, a laptop 222, and/or any other remote electronic device 220. Video/multimedia server 202 may transmit these video streams via network link 214 and/or network 224.

For example, a remote gaming device at the same location may be utilized at a casino with multiple casino floors, a casino that allows wagering activities to take place from the hotel room, a casino that may allow wagering activities to take place from the pool area, etc. In another example, the remote devices may be at another location via a progressive link to another casino, and/or a link within a casino corporation that owns numerous casinos (e.g., MGM, Caesars, etc.).

Gaming server 204 may generate gaming outcomes. Gaming server 204 may provide electronic gaming device 100 with game play content. Gaming server 204 may provide electronic gaming device 100 with game play math and/or outcomes. Gaming server 204 may provide one or more of a payout functionality, a platform game play functionality, a platform game play evaluation functionality, other game functionality, and/or any other virtual game functionality.

Player tracking server 206 may track a player's betting activity, a player's preferences (e.g., language, font, sound level, drinks, etc.). Based on data obtained by player tracking server 206, a player may be eligible for gaming rewards (e.g., free play), promotions, and/or other awards (e.g., complimentary food, drinks, lodging, concerts, etc.).

Voucher server 208 may generate a voucher, which may include data relating to gaming. Further, the voucher may include payline structure option selections. In addition, the voucher may include platform based game play data (or similar game play data), repeat payline data, pattern data, historical payout data, column data, row data, and/or symbols that were modified.

Authentication server 210 may determine the validity of vouchers, player's identity, and/or an outcome for a gaming event.

Accounting server 212 may compile, track, and/or monitor cash flows, voucher transactions, winning vouchers, losing vouchers, and/or other transaction data. Transaction data may include the number of wagers, the size of these wagers, the date and time for these wagers, the identity of the players making these wagers, and/or the frequency of the wagers. Accounting server 212 may generate tax information relating to these wagers. Accounting server 212 may generate profit/loss reports for players' tracked outcomes.

Network connection 214 may be used for communication between dedicated servers, thin clients, thick clients, back-office accounting systems, etc.

Laptop computer 222 and/or any other electronic devices (e.g., mobile phone 230, electronic gaming device 100, etc.) may be used for downloading new gaming device applications or gaming device related firmware through remote access.

Laptop computer 222 and/or any other electronic device (e.g., mobile phone 230, electronic gaming device 100, etc.) may be used for uploading accounting information (e.g., cashable credits, non-cashable credits, coin in, coin out, bill in, voucher in, voucher out, etc.).

Network 224 may be a local area network, a casino premises network, a wide area network, a virtual private network, an enterprise private network, the Internet, or any combination thereof. Hardware components, such as network interface cards, repeaters and hubs, bridges, switches, routers, firewalls, or any combination thereof may also be part of network 224.

A statistics server may be used to maintain data relating to historical game play for one or more electronic gaming devices 100. This historical data may include winning amounts, winning data (e.g., person, sex, age, time on machine, amount of spins before winning event occurred, etc.), fastest winning event reoccurrence, longest winning event reoccurrence, average frequencies of winning events, average winning amounts, highest winning amount, lowest winning amount, locations for winning events, winning event dates, winning machines, winning game themes, and/or any other data relating to game play.

Statistics server may include data relating to one or more platform based game play (or similar game play). This data may include the number of times a specific item (e.g., a tool, a movement pattern (e.g., jump up and to the right, etc.) was selected. The frequency of any specific item being selected and the amount won. This data may also include data relating to any interrelationship of elements. For example, when the rope is utilized, the player selects an upper right symbol to utilize the rope on 75% of the time. Further, this selection pairing results in a winning result 55% of the time. In another example, when the latter is selected as the tool to be utilized by the player, the player uses the latter to go up (instead of down or across) 63% of the time. Further, this selection pairing results in a winning result 79% of the time.

Figure 3:
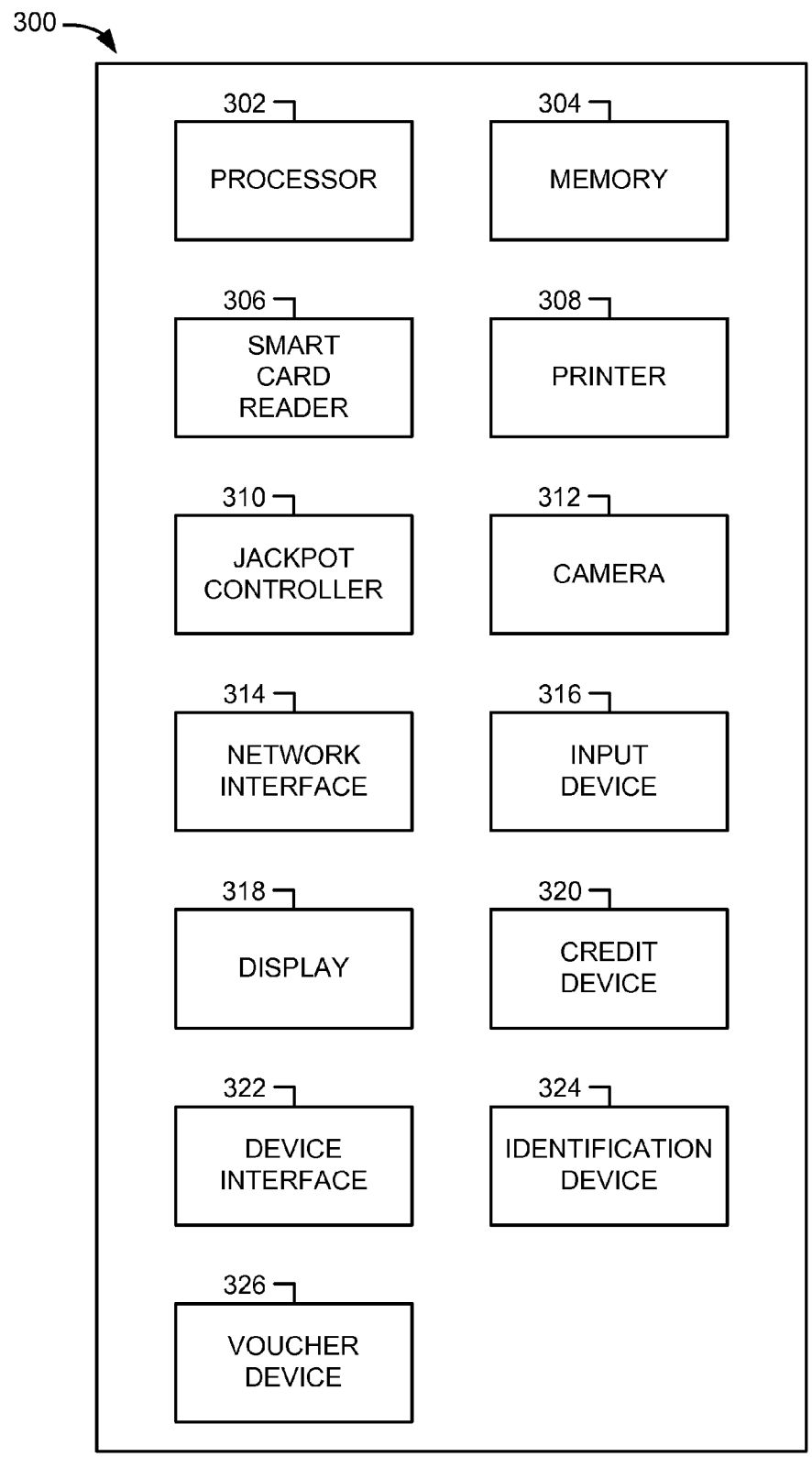
FIG. 3 is a block diagram of the electronic gaming device, according to one embodiment.

FIG. 3 shows a block diagram 300 of electronic gaming device 100. Electronic gaming device 100 may include a processor 302, a memory 304, a smart card reader 306, a printer 308, a jackpot controller 310, a camera 312, a network interface 314, an input device 316, a display 318, a credit device 320, a device interface 322, an identification device 324, and a voucher device 326.

Processor 302 may execute program instructions of memory 304 and use memory 304 for data storage. Processor 302 may also include a numeric co-processor, or a graphics processing unit (or units) for accelerated video encoding and decoding, and/or any combination thereof.

Processor 302 may include communication interfaces for communicating with electronic gaming device 100, electronic gaming system 200, and user interfaces to enable communication with all gaming elements. For example, processor 302 may interface with memory 304 to access a player's mobile device through device interface 322 to display contents onto display 318. Processor 302 may generate a voucher based on a wager confirmation, which may be received by an input device, a server, a mobile device, and/or any combination thereof. A voucher device may generate, print, transmit, or receive a voucher. Memory 304 may include communication interfaces for communicating with electronic gaming device 100, electronic gaming system 200, and user interfaces to enable communication with all gaming elements. For example, the information stored on memory 304 may be printed out onto a voucher by printer 308. Videos or pictures captured by camera 312 may be saved and stored on memory 304. Memory 304 may include a confirmation module, which may authenticate a value of a voucher and/or the validity of the voucher. Processor 302 may determine the value of the voucher based on generated voucher data and data in the confirmation module. Electronic gaming device 100 may include a player preference input device. The player preference input device may modify a game configuration. The modification may be based on data from the identification device.

Memory 304 may be non-volatile semiconductor memory, such as read-only memory ("ROM"), erasable programmable read-only memory ("EPROM"), electrically erasable programmable read-only memory ("EEPROM"), flash memory ("NVRAM"), Nano-RAM (e.g., carbon nanotube random access memory), and/or any combination thereof.

Memory 304 may also be volatile semiconductor memory such as, dynamic random access memory ("DRAM"), static random access memory ("SRAM"), and/or any combination thereof.

Memory 304 may also be a data storage device, such as a hard disk drive, an optical disk drive such as, CD, DVD, Blu-ray, a solid state drive, a memory stick, a CompactFlash card, a USB flash drive, a Multi-media Card, an xD-Picture Card, and/or any combination thereof.

Memory 304 may be used to store read-only program instructions for execution by processor 302, for the read-write storage for global variables and static variables, read-write storage for uninitialized data, read-write storage for dynamically allocated memory, for the read-write storage of the data structure known as "the stack," and/or any combination thereof.

Memory 304 may be used to store the read-only paytable information for which symbol combinations on a given payline that result in a win (e.g., payout) which are established for games of chance, such as slot games and video poker.

Memory 304 may be used to store accounting information (e.g., cashable electronic promotion in, non-cashable electronic promotion out, coin in, coin out, bill in, voucher in, voucher out, electronic funds transfer in, etc.).

Memory 304 may be used to record error conditions on an electronic gaming device 100, such as door open, coin jam, ticket print failure, ticket (e.g., paper) jam, program error, reel tilt, etc., and/or any combination thereof.

Memory 304 may also be used to record the complete history for the most recent game played, plus some number of prior games as may be determined by the regulating authority.

Smart card reader 306 may allow electronic gaming device 100 to access and read information provided by the player or technician, which may be used for setting the player preferences and/or providing maintenance information. For example, smart card reader 306 may provide an interface between a smart card (inserted by the player) and identification device 324 to verify the identity of a player.

Printer 308 may be used for printing slot machine payout receipts, slot machine wagering vouchers, non-gaming coupons, slot machine coupons (e.g., a wagering instrument with a fixed wagering value that can only be used for non-cashable credits), drink tokens, comps, and/or any combination thereof.

Electronic gaming device 100 may include a jackpot controller 310, which may allow electronic gaming device 100 to interface with other electronic gaming devices either directly or through electronic gaming system 200 to accumulate a shared jackpot.

Camera 312 may allow electronic gaming device 100 to take images of a player or a player's surroundings. For example, when a player sits down at the machine their picture may be taken to include his or her image into the game play. A picture of a player may be an actual image as taken by camera 312. A picture of a player may be a computerized caricature of the image taken by camera 312. The image obtained by camera 312 may be used in connection with identification device 324 using facial recognition. Camera 312 may allow electronic gaming device 100 to record video. The video may be stored on memory 304 or stored remotely via electronic gaming system 200. Videos obtained by camera 312 may then be used as part of game play, or may be used for security purposes. For example, a camera located on electronic gaming device 100 may capture videos of a potential illegal activity (e.g., tampering with the machine, crime in the vicinity, underage players, etc.).

Network interface 314 may allow electronic gaming device 100 to communicate with video/multimedia server 202, gaming server 204, player tracking server 206, voucher server 208, authentication server 210, and/or accounting server 212.

Input device 316 may be mechanical buttons, electronic buttons, a touch screen, and/or any combination thereof. Input device 316 may be utilized to make a wager, to select one or more game elements, to select one or more platform based gaming options, to make an offer to buy or sell a voucher, to determine a voucher's worth, to cash in a voucher, to modify electronic gaming device 100 (e.g., change sound level, configuration, font, language, etc.), to select a movie or music, to select live video streams (e.g., sporting event 1, sporting event 2, sporting event 3), to request services (e.g., drinks, manager, etc.), and/or any combination thereof.

Display 318 may show video streams from one or more content sources. Display 318 may encompass first display screen 102, second display screen 104, third display screen 106, side display screen 108, and/or another screen used for displaying video content.

Credit device 320 may be utilized to collect monies and distribute monies (e.g., cash, vouchers, etc.). Credit device 320 may interface with processor 302 to allow game play to take place. Processor 302 may determine any payouts, display configurations, animation, and/or any other functions associated with game play. Credit device 320 may interface with display 318 to display the amount of available credits for the player to use for wagering purposes. Credit device 320 may interface via device interface 322 with a mobile device to electronically transmit money and/or credits. Credit device 320 may interface with a player's pre-established account, which may be stored on electronic gaming system 200, to electronically transmit money and/or credit. For example, a player may have a credit card or other mag-stripe card on file with the location for which money and/or credits can be directly applied when the player is done. Credit device 320 may interface with a player's card to exchange player points.

Electronic gaming device 100 may include a device interface 322 that a user may employ with his or her mobile device (e.g., smart phone) to receive information from and/or transmit information to electronic gaming device 100 (e.g., watch a movie, listen to music, obtain verbal betting options, verify identification, transmit credits, etc.).

Identification device 324 may be utilized to allow electronic gaming device 100 to determine an identity of a player. Based on information obtained by identification device 324, electronic gaming device 100 may be reconfigured. For example, the language, sound level, music, placement of video streams, placement of images, placement of gaming options, and/or the tables utilized may be modified based on player preference data.

For example, a player may have selected a specific baseball team (e.g., Atlanta Braves) under the sporting event preferences, the electronic gaming device 100 will then automatically (or via player input) display the current baseball game (e.g., Atlanta Braves vs. Philadelphia Phillies) onto side display screen 108 and/or an alternate display screen as set in the player's options.

A voucher device 326 may generate, print, transmit, or receive a voucher. The voucher may represent a wagering option, a wagering structure, a wagering timeline, a value of wager, a payout potential, a payout, and/or any other wagering data. A voucher may represent an award, which may be used at other locations inside of the gaming establishment. For example, the voucher may be a coupon for the local buffet or a concert ticket.

Figure 4:
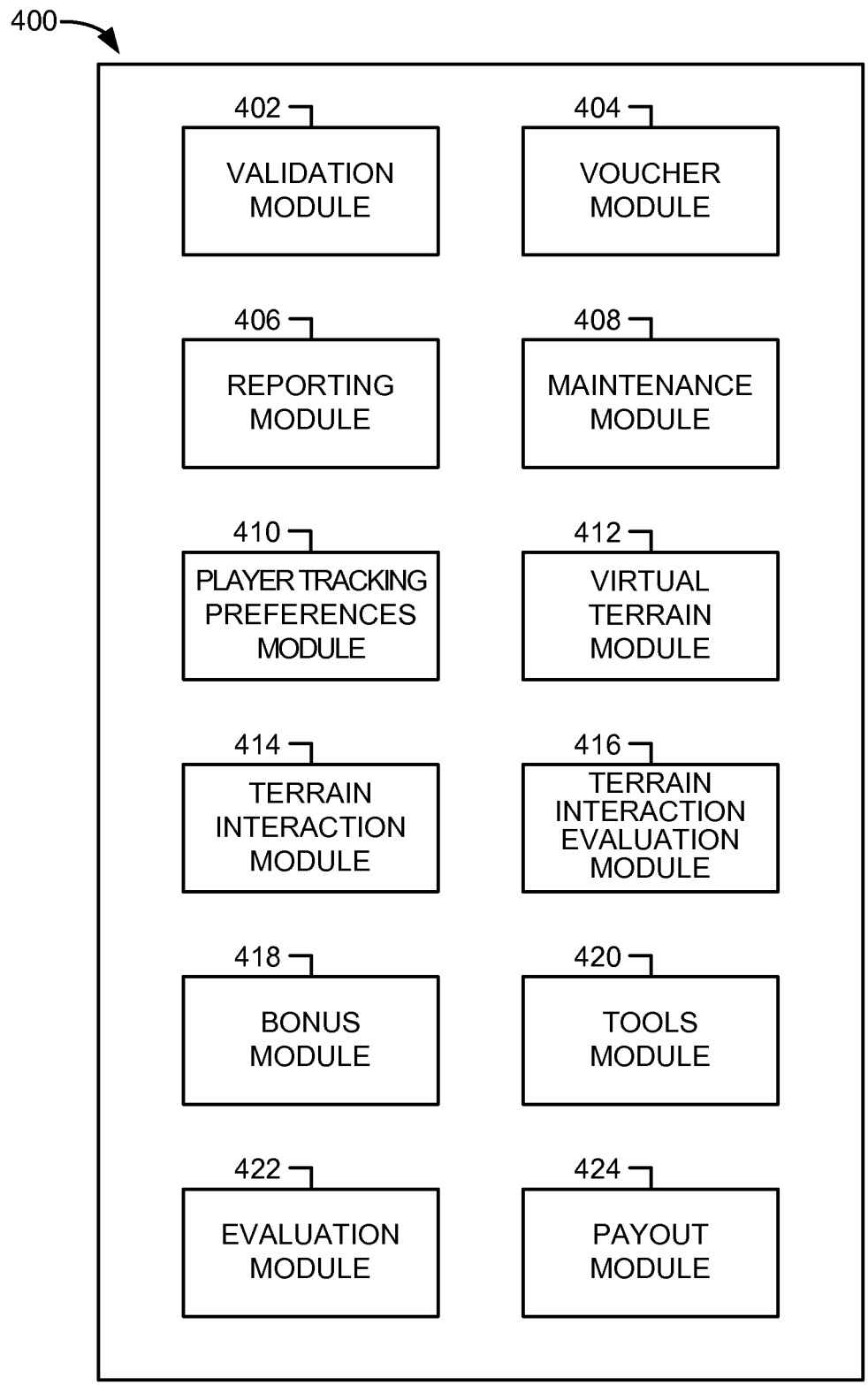
FIG. 4 is another block diagram of the electronic gaming device, according to one embodiment.

FIG. 4 shows a block diagram of memory 304, which includes various modules. Memory 304 may include a validation module 402, a voucher module 404, a reporting module 406, a maintenance module 408, a player tracking preferences module 410, a virtual terrain module 412, a terrain interaction module 414, a terrain interaction evaluation module 416, a bonus module 418, a tools module 420, and an evaluation module 422.

Validation module 402 may utilize data received from voucher device 326 to confirm the validity of the voucher.

Voucher module 404 may store data relating to generated vouchers, redeemed vouchers, bought vouchers, and/or sold vouchers.

Reporting module 406 may generate reports related to a performance of electronic gaming device 100, electronic gaming system 200, video streams, gaming objects, credit device 114, and/or identification device 118.

Maintenance module 408 may track any maintenance that is implemented on electronic gaming device 100 and/or electronic gaming system 200. Maintenance module 408 may schedule preventative maintenance and/or request a service call based on a device error.

Player tracking preferences module 410 may compile and track data associated with a player's preferences.

Virtual terrain module 412 may generate, compile, store, and/or display one or more virtual terrains. These one or more virtual terrains may be utilized in one or more game play options. These one or more virtual terrains may be utilized in a base game and/or a bonus game. Virtual terrain may be generated on a paying selection of symbols (e.g., a payline) on a matrix. This may occur based on a random occurrence of symbols from the reel spins, through player interaction, a predetermined rate of occurrence, and/or any combination thereof. In one example, each strip of terrain is a platform that presents a virtual path and/or a challenge to surmount.

Terrain interaction module 414 may generate, compile, transmit, and/or store data relating to the interactions of one or more terrains with one or more inputs received from the player, electronic gaming device 100, and/or electronic gaming system 200. In one example, a graphical image representing a character and/or vehicle (e.g., an Actor) moves across the screen on the generated terrain using some sort of physics simulation (e.g., a moving person subjected to gravity, a vehicle driving, a device flying, etc.). The Actor may further utilize abilities and/or tools to navigate the terrain and/or overcome the challenges presented to it.

Terrain interaction evaluation module 416 may evaluate one or more inputs received from the player, electronic gaming device 100, and/or electronic gaming system 200 with the interactions related to one or more terrains. In one example, the Actor may be controlled entirely by software and/or in combination with human (e.g., a player) interaction based on physical buttons, touch screen gestures, on screen choices (e.g., picks), an analogue or digital control (e.g., a joystick, trackball, direction pad, etc.).

Bonus module 418 may generate a bonus game, evaluate the results of the bonus game, trigger bonus game presentations, generate bonus game payouts, and/or display any data relating to the bonus game.

Tools module 420 may generate, compile, transmit, and/or store data relating to one or more tools. In addition, tools module 420 may generate, compile, transmit, and/or store data relating to the interactions of one or more tools with one or more inputs received from the player, electronic gaming device 100, electronic gaming system 200, and/or one or more terrains. Further, tools module 420 may evaluate one or more inputs received from the player, electronic gaming device 100, and/or electronic gaming system 200 with the interactions related to one or more tools. Also, tools module 420 may evaluate one or more inputs received with one or more terrain characteristics to interaction data related to one or more tools.

Evaluation module 422 may evaluate one or more outcomes for one or more events which may not be based on one or more outcomes for one or more platform based game play. Evaluation module 422 may evaluate one or more outcomes for one or more events which may be based on one or more outcomes for one or more platform based game play.

Payout module 424 may determine one or more payouts which may relate to one or more inputs received from the player, electronic gaming device 100, and/or electronic gaming system 200. Payout module 424 may determine one or more payouts based on one or more tools utilized, one or more terrains/and/or any combination thereof.

Virtual terrain module 412 may include data relating to one or more terrains. For example, friction data may be included relating to one or more surfaces (e.g., latter, hill, rope, floor, ground, water, air, tunnels, roads to different areas of the game, etc.). In another example, tilting information (e.g., the ability of floor, ground, and/or any surface to shift) may be included relating to one or more surfaces. In one example, a flying vehicle may be directed to go through a cavern. In another example, a car may be directed to go down a road and through a tunnel and/or over a bridge. In another example, the terrain is defined by navigable areas (e.g., payline driven, paying symbols, etc.) and non-navigable areas (e.g., non-paylines, non-paying symbols, etc.).

A presentation generation module may generate the presentation data (e.g., visual and audio) relating to one or more game play options. A presentation module may display one or more of the generated presentations.

It should be noted that one or more modules may be combined into one module. Further, there may be one evaluation module where the determined payout does not depend on whether there were any wild symbols, scatter symbols, platform based game play, and/or any other specific symbols. Further, any module, device, and/or logic function in electronic gaming device 100 may be present in electronic gaming system 200. In addition, any module, device, and/or logic function in electronic gaming system 200 may be present in electronic gaming device 100.

Figure 5A:
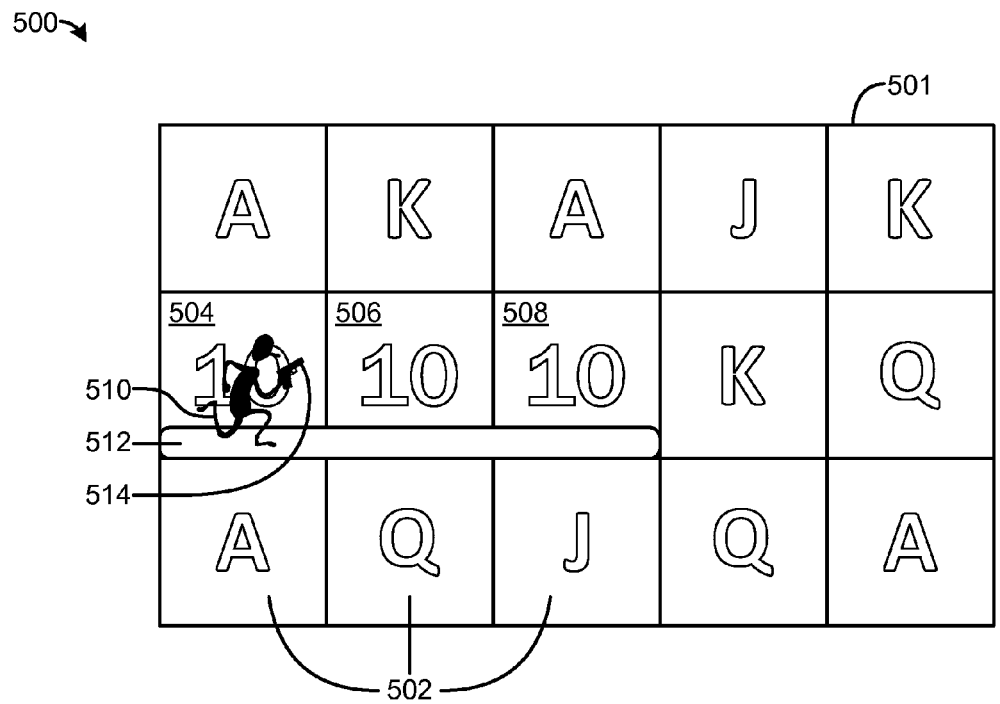
FIG. 5A is an illustration of a platform based game play, according to one embodiment.

FIG. 5A is an illustration of a platform game play, according to one embodiment. A first display image 500 may include a plurality of reels 501 which may include a plurality of symbols 502. First display image 500 may include a combination of symbols (e.g., a first symbol 504, a second symbol 506, and a third symbol 508) which may be or may not be a winning combination. However, this combination of symbols (e.g., first symbol 504, second symbol 506, and third symbol 508) may trigger a first image 510 (e.g., a person, an animal, a vehicle, etc.) to be displayed. First image 510 may be a person. First image 510 may be able to travel on a first platform 512 and may have a first tool 514 (e.g., a gun, a rope, a latter, etc.). In one example, the combination of symbols (e.g., first symbol 504, second symbol 506, and third symbol 508) is three similar symbols (e.g., 10s).

Figure 5B:
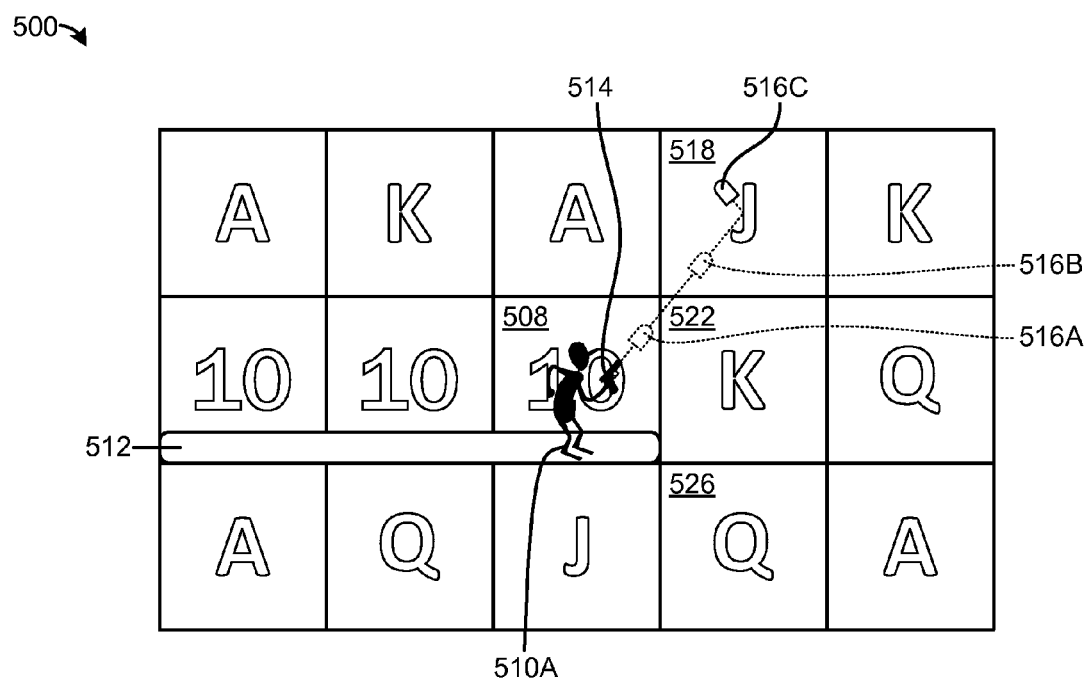
FIG. 5B is another illustration of a platform based game play, according to one embodiment.

FIG. 5B is another illustration of a platform game play, according to one embodiment. In one example, first image 510 may have moved to a first location 510A where third symbol 508 is positioned. The player (or electronic gaming device 100 or electronic gaming system 200) may be able to select one or more of a first target 518, a second target 522, and a third target 526. The player (or electronic gaming device 100 or electronic gaming system 200) may select one or more of first target 518, second target 522, and third target 526 to potentially transform the J (e.g., first target 518), the K (e.g., second target 522), and/or the Q (e.g., third target 526) into a symbol which may either extend an already winning symbol combination and/or generate a new winning symbol combination. In one example, the selection may be to utilize first tool 514 to shot a bullet at first target 518 (e.g., the J). The bullet may be animated and travel in a path represented by a bullet first position 516A, a bullet second position 516B, and/or a bullet third position 516C. In this example, the bullet may not have changed the J to another symbol. Therefore, the combination of symbols (e.g., first symbol 504, second symbol 506, and third symbol 508) may be unchanged. This combination of symbols (e.g., first symbol 504, second symbol 506, and third symbol 508) may have generated a prize (e.g., credits, free spins, multiplier, etc.). This combination of symbols (e.g., first symbol 504, second symbol 506, and third symbol 508) may not have generated a prize.

Figure 5C:
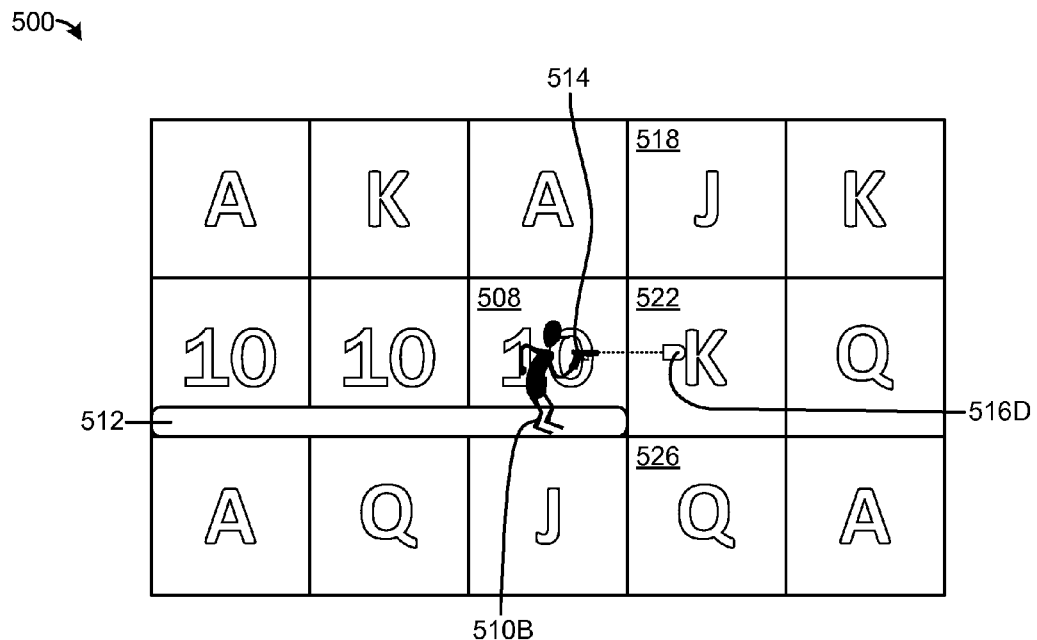
FIG. 5C is another illustration of a platform based game play, according to one embodiment.

FIG. 5C is an illustration of a platform game play, according to one embodiment. In one example, first image 510 may have moved to a second location 510B where third symbol 508 is positioned. The player (or electronic gaming device 100 or electronic gaming system 200) may be able to select one or more of first target 518, second target 522, and third target 526 (or any number of targets—therefore any symbol (e.g., any A, any K, any Q, any J, etc.) may be targeted). In this example, the player (or electronic gaming device 100 or electronic gaming system 200) may select one or more of first target 518, second target 522, and third target 526 to potentially transform the J (e.g., first target 518), the K (e.g., second target 522), and/or the Q (e.g., third target 526) into a symbol which may either extend an already winning symbol combination and/or generate a new winning symbol combination. In one example, the selection may be to utilize first tool 514 to shot a bullet at second target 522, which may transform the K at second target 522 into a 10 (see FIG. 5D).

Figure 5D:
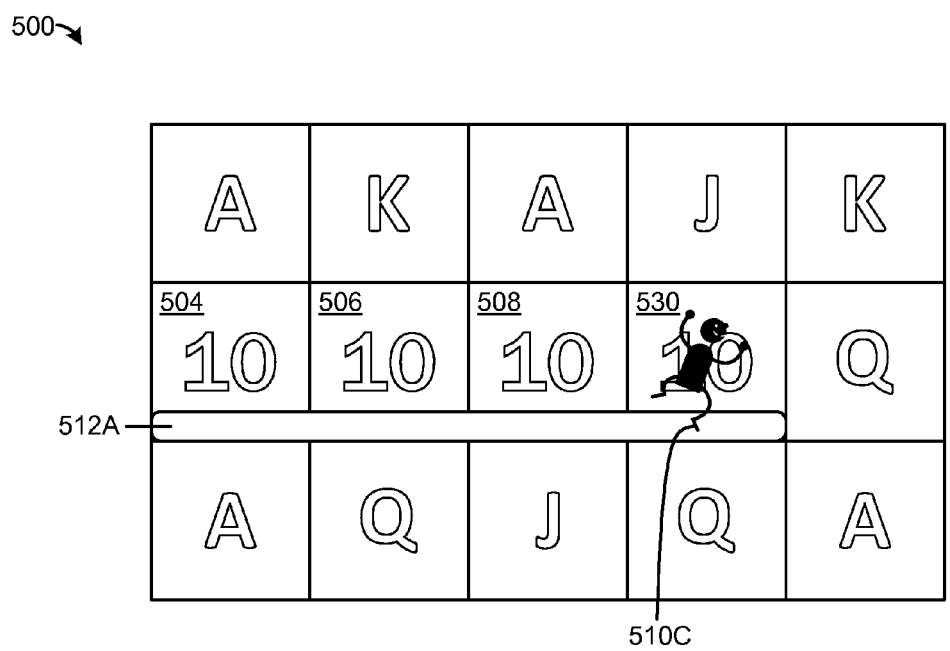
FIG. 5D is another illustration of a platform based game play, according to one embodiment.

FIG. 5D is an illustration of a platform game play, according to one embodiment. In this example, first platform 512 may be increased to a second platform 512A because second target 522 (e.g., the K) was transformed into a fourth symbol 530 (e.g., a 10). The transformation of the K into a 10 may extend a symbol combination from a first symbol combination (e.g., first symbol 504, second symbol 506, and third symbol 508) into a second symbol combination (e.g., first symbol 504, second symbol 506, third symbol 508, and fourth symbol 530). Second symbol combination may be four 10s in a row, which may be a winning symbol combination and/or an increase winning symbol combination (when compared to the first symbol combination). First image 510 may be moved to a third position 510C where fourth symbol 530 is located.

In one example, a friction controller may include a friction arrow which may be located in a friction guide. The friction arrow may indicate a friction setting for one or more surfaces, terrains, and/or tools. In one example, a friction setting of 7 may be indicated by a friction image (e.g., an image of a 7).

Any friction amount may be utilized. The friction controller may control the friction effect for surfaces, terrains, and/or tools. For example, a rope which may be utilized as a tool may have a friction setting of 5. Therefore, the rope may require an average amount of force from an image to climb the rope. These friction elements may be utilized for presentation purposes, may be utilized in a skills-based gaming function, and/or may be utilized to require a certain amount of an item (e.g., credits, chances, turns, past playing time, player level, loyal card level, loyalty points, etc.) to achieve a function.

For example, a presentation based on a friction setting of 5 may move slower than a presentation based on a friction setting of 4. In addition, a first friction setting on a first area may slow down an image in that first area more that when a second friction setting on a second area is utilized.

One or more friction levels may be utilized. One or more friction levels may be any number (e.g., 0 to Nth friction characteristics). In this example, one or more friction levels may be 1 to 10.

An angle controller may include an angle indicator which may be located in an angle guider. The angle indicator may indicate an angle setting. In one example, an angle of 10 degrees may be indicated by an angle image (e.g., an image with the angle indicator pointing to a 10). Any angle may be utilized. The angle controller may control the angle of one or more surfaces, terrains, and/or tools, and/or any other game play angle.

A tilt controller may include a tilt indicator which may be located in a tilt guider. Tilt indicator may indicate a tilt setting. In one example, a tilt of 4 may be indicated by a tilt image (e.g., an image with the tilt indicator pointing to a 4). Any tilt number (e.g., 1 to Nth) may be utilized. The tilt controller may control the tilting (e.g., tilt function, tilt ability) of surfaces, terrains, and/or tools, and/or any other game play tilting affect.

A tension controller may include a tension indicator which may be located in a tension guider. Tension indicator may indicate a tension setting. In one example, a tension of 24 may be indicated by a tension image (e.g., an image with a tension indicator pointing to a 24). Any tension number may be utilized. The tension controller may control the tension of one or more surfaces, terrains, and/or tools, and/or any other game play tension.

A movement button may be utilized to move one or more images, surfaces, terrains, and/or tools. Any image, surface, terrain, tools, and/or any other gaming feature may move in any direction (e.g., up, down, right, left, and/or any combination thereof). In one example, the game play may be or have a skill based option. In this example, a player may control the Actor with a game controller, mouse, directional buttons, joystick, trackball, motion-sensing cameras, and/or touch screen gestures through a virtual terrain using stimulated physics.

A display area may be utilized to display any image functionality, surface functionality, terrain functionality, tool functionality, and/or any other gaming feature.

In one embodiment, a player, electronic gaming device 100, and/or electronic gaming system 200 may select one or more image functionality, surface functionality, terrain functionality, tool functionality, and/or any other gaming feature.

In various examples, the player, electronic gaming device 100, and/or electronic gaming system 200 may select from 1 through $n^{th}$ of the image functionality, surface functionality, terrain functionality, tool functionality available for selection. Any number of objects, characters, weapons, images, obstacles, and/or selections may be utilized.

One or more of the symbols (e.g., targets—first target 518, second target 522, third target 526) may be a stopper, which may end game play. It should be noted that the objects may be any item (e.g., a person, a weapon, a structure, an animal, a vehicle, a tool, an instrument, a natural feature (e.g., hill, mountain, lake, sea, etc.), a machine, and/or any other item).

Game data area may include additional data relating to the games. For example, a game menu, a bet amount, a winning total, a credit total, a betting increment (e.g., $0.01 per credit), an input button (e.g., move an object (e.g., person, tool, animal, any image, etc.) select, play, deal, draw, shot, etc.), and/or any other gaming data may be shown.

Game menu button may include data relating to the game. For example, the payout structures, payout odds, the amount won over a predetermined number of game plays, the amount won over a specific time frame, and/or any other game play data may be accessed via game menu button. Game menu button may be utilized to change the game from a first game (e.g., slot machine theme 1) to a second game (e.g., slot machine theme 2, poker, blackjack, roulette, baccarat, craps, etc.). Game menu button may be utilized to change any other game structure (e.g., credit amounts). For example, the credit amount may be increased/decreased between $0.01 to $1.00 and/or any other values.

A bet reducer button (e.g., a downward arrow) may decrease the amount of credits wagered on game play. A bet amount image (e.g., 250) may show the amount of credits wagered on game play. A bet increaser button (e.g., an upward arrow) may increase the amount of credits wagered on game play. A credit amount image (e.g., 150,015) may show the amount of credits available to the player for game play. A win amount area (e.g., 1,000) may show the payout amount of the last event. A credit value image (e.g., $0.01) may show the value of a single credit. A play button may start the next game. A message area may display any message to the player. For example, the message may state "You Won 1,000 Credits. Congratulations!!!!!".

A fast play button may be utilized to speed up the game, automate the game (e.g., electronic gaming device 100 and/or electronic gaming system 200 selects the object), and/or reduce the presentations.

Game data area may include a betting area, a play button, and/or a total credits area. Betting area may show the amount of a bet. Play button (e.g., spin, platform game play) may initiate game play. Total credits area may show a player's credit balance.

Figure 6A:
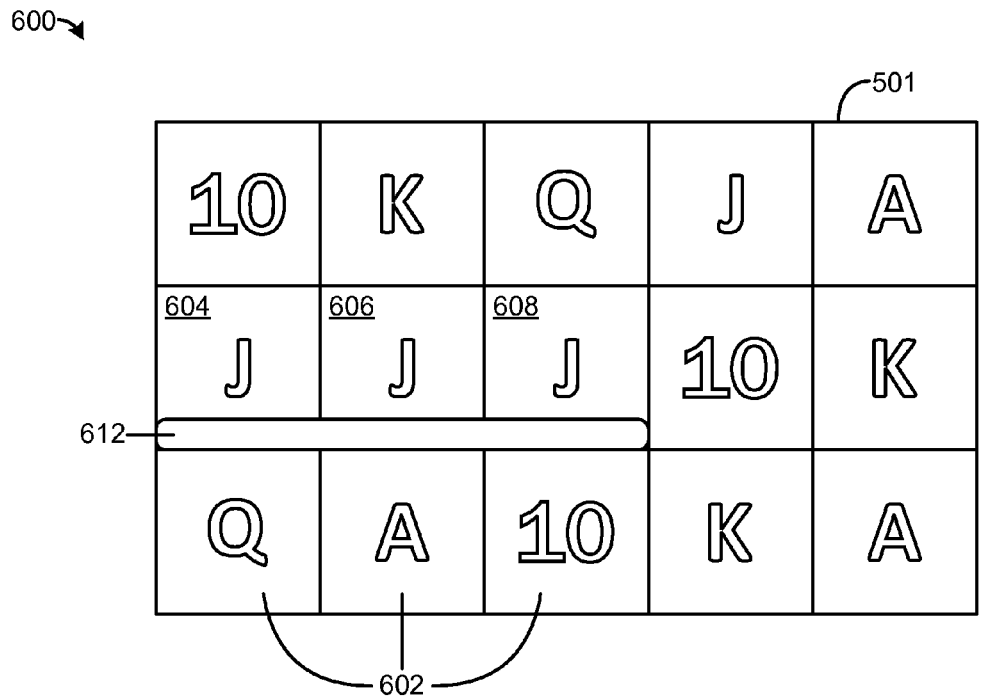
FIG. 6A is an illustration of a platform based game play, according to one embodiment.

FIG. 6A is another illustration of a platform game play, according to one embodiment. A second display image 600 may include plurality of reels 501 which may include a second plurality of symbols 602. Second display image 600 may include a third combination of symbols (e.g., a fifth symbol 604, a sixth symbol 606, and a seventh symbol 608) which may be or may not be a winning combination. However, this combination of symbols (e.g., fifth symbol 604, sixth symbol 606, and seventh symbol 608) may trigger a second image 610 (e.g., a person, an animal, a vehicle, etc.) to be displayed (see FIG. 6B). Second image 610 may be a person. Second image 610 may be able to travel on a third platform 612 and may have one or more tools (e.g., a gun, a rope, a latter, pole, car, etc.) to utilize. In one example, the combination of symbols (e.g., fifth symbol 604, sixth symbol 606, and seventh symbol 608) is three similar symbols (e.g., Js).

In various examples, first image 510, second image 610, and/or any other image may be triggered by one symbol, a combination of two symbols, a combination of three symbols, a combination of four symbols, etc. Further, first image 510, second image 610, and/or any other image may be triggered randomly, on a predetermined basis, by a shuffling pattern, by one symbol, a combination of two symbols, a combination of three symbols, a combination of four symbols, and/or any combination thereof. For example, first image 510 may be triggered after a combination of three symbols occurs after a predetermined time period has elapsed (e.g., 5 minutes). In another example, after a combination of two symbols occurs, first image 510 may be triggered when a combination of three symbols occurs and/or two symbols occurs.

Figure 6B:
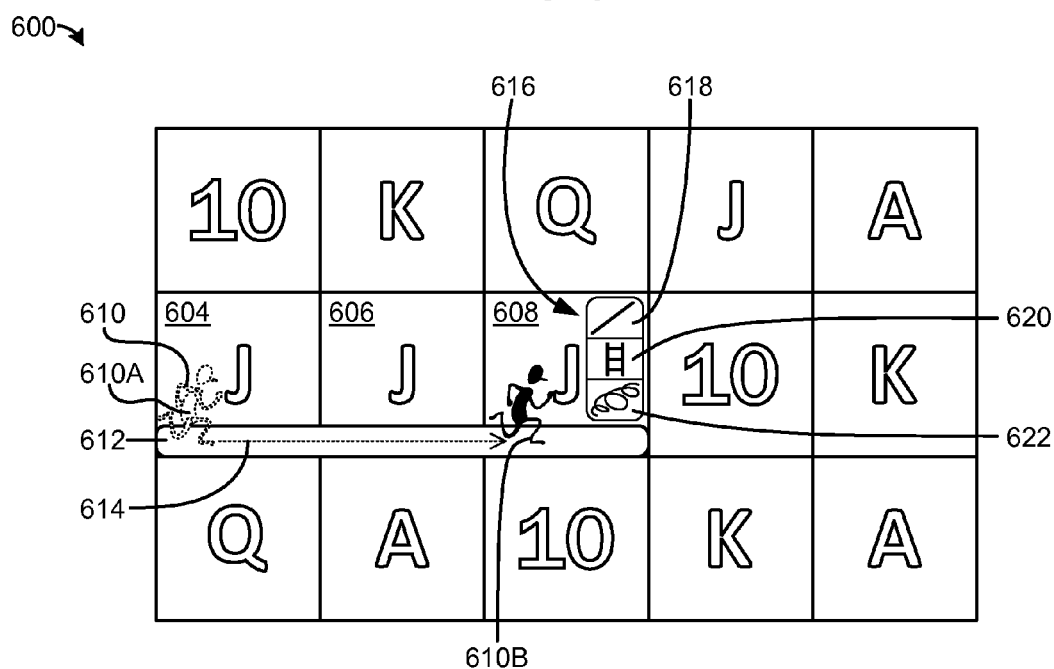
FIG. 6B is another illustration of a platform based game play, according to one embodiment.

FIG. 6B is another illustration of a platform game play, according to one embodiment. In one example, second image 610 may move from a first second image position 610A to a second image position 610B (e.g., where seventh symbol 608 is located) via a first path 614. Second image 610 at second second image position 610B may encounter a tool area 616 (e.g., tool box). Tool area 616 may include one or more tools (e.g., a first tool 618, a second tool 620, a third tool 622, etc.). First tool 618 may be a pole. Second tool 620 may be a latter. Third tool 622 may be a rope. Any tool (e.g., hammer, gun, rake, rope, pole, car, latter, arrow, trampoline, etc.) may be utilized.

Figure 6C:
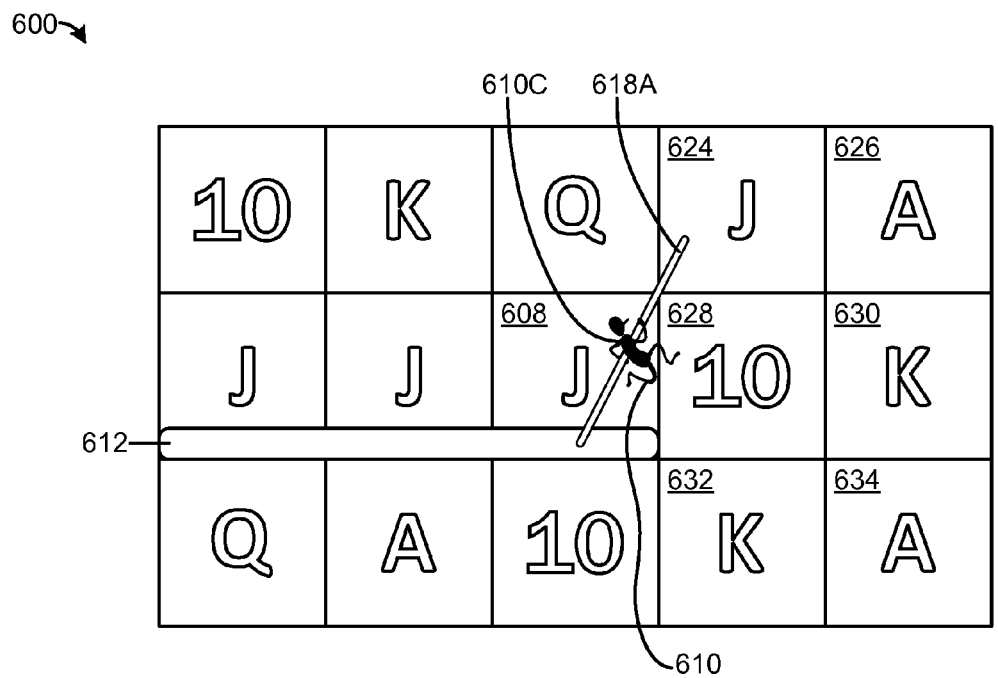
FIG. 6C is another illustration of a platform based game play, according to one embodiment.

FIG. 6C is another illustration of a platform game play, according to one embodiment. In second display image 600, first tool 618 was selected from the tools in tool area 616. Second image 610 may utilize first tool 618 (e.g., pole) to select a fourth target 624, a fifth target 626, a sixth target 628, a seventh target 630, an eighth target 632, and/or a ninth target 634. In one example, second image 610 via first tool 618 (e.g., pole) selects fourth target 624. In one example, second image 610 via first tool 618 may reach fourth target 624. In this example, first tool 618 may be shown in a first tool position 618A and second image 610 may be shown in a third position for second image 610C. Since fourth target 624 was a J, a new combination of symbols may be created. The additional J symbol (e.g., at fourth target 624 position) may extend a symbol combination from a third symbol combination (e.g., fifth symbol 604, sixth symbol 606, and seventh symbol 608) into a fourth symbol combination (e.g., fifth symbol 604, sixth symbol 606, seventh symbol 608, and fourth target 624 (or an eighth symbol)). Fourth symbol combination may be four Js in a row, which may be a winning symbol combination and/or an increase winning symbol combination (when compared to the third symbol combination).

In another example, if second image 610 had utilize any of the tools (e.g., first tool 618, second tool 620, third tool 622, etc.) to select one or more of fifth target 626, sixth target 628, seventh target 630, eighth target 632, and/or ninth target 634, then second image 610 may have been able to reach one or more of fifth target 626, sixth target 628, seventh target 630, eighth target 632, and/or ninth target 634 without transforming one or more of fifth target 626, sixth target 628, seventh target 630, eighth target 632, and/or ninth target 634 into a symbol which may have created a winning symbol combination and/or an increase winning symbol combination.

In another example, if second image 610 had utilize any of the tools (e.g., first tool 618, second tool 620, third tool 622, etc.) to select one or more of fifth target 626, sixth target 628, seventh target 630, eighth target 632, and/or ninth target 634, then second image 610 may have been able to reach one or more of fifth target 626, sixth target 628, seventh target 630, eighth target 632, and/or ninth target 634 and transformed one or more of fifth target 626, sixth target 628, seventh target 630, eighth target 632, and/or ninth target 634 into a symbol which may have created a winning symbol combination and/or an increase winning symbol combination.

Figure 6D:
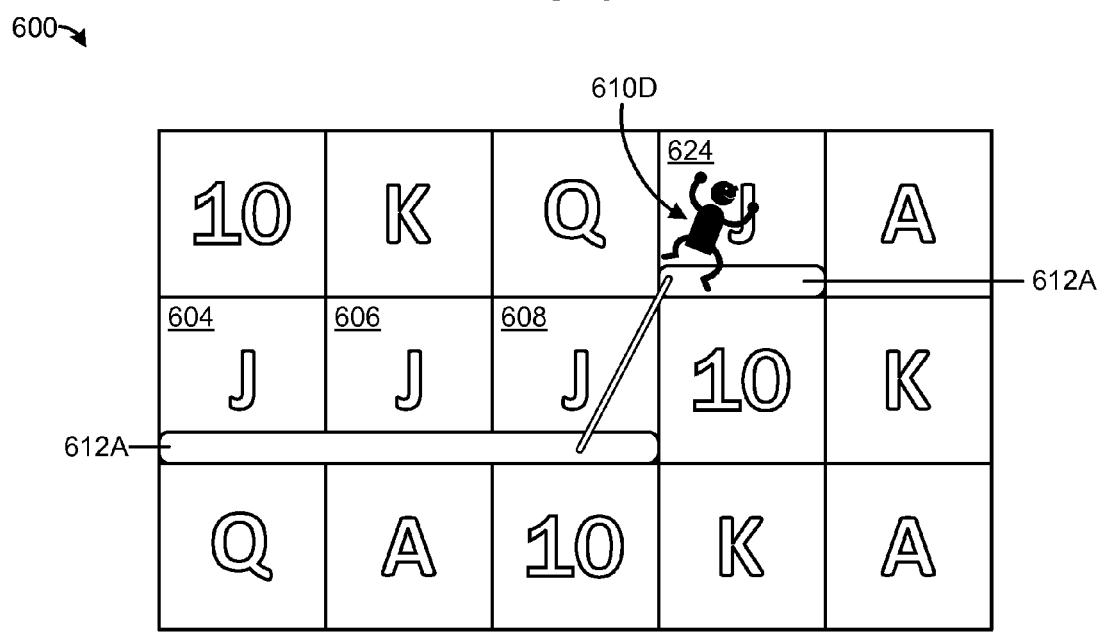
FIG. 6D is another illustration of a platform based game play, according to one embodiment.

FIG. 6D is another illustration of a platform game play, according to one embodiment. A new platform may be created by the movement of second image 610, which may be a fourth platform 612A.

Figure 7A:
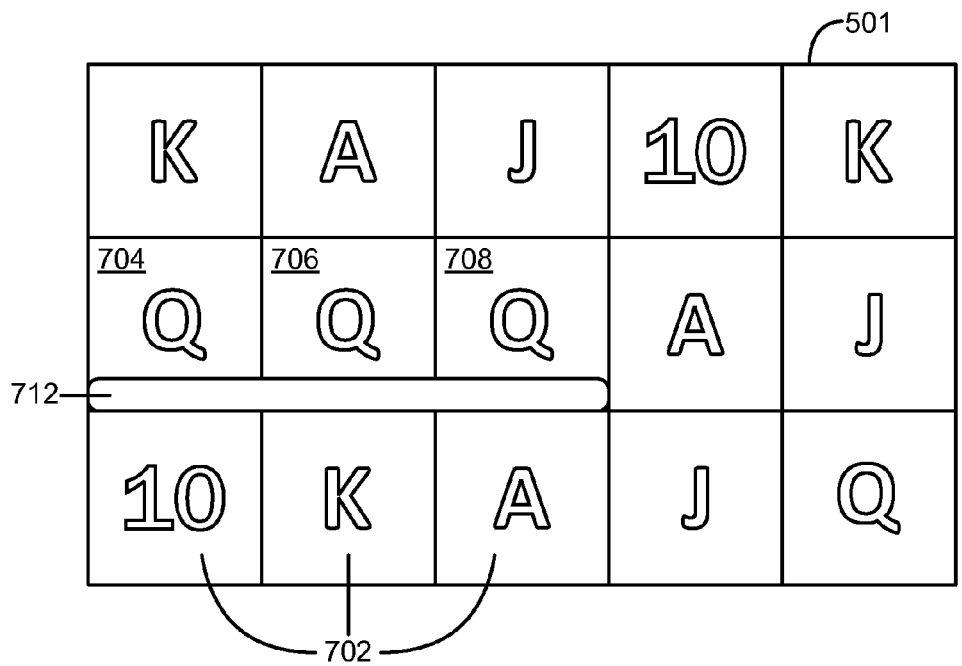
FIG. 7A is an illustration of a platform based game play, according to one embodiment.

FIG. 7A is another illustration of a platform game play, according to one embodiment. A third display image 700 may include plurality of reels 501 which may include a third plurality of symbols 702. Third display image 700 may include a fifth combination of symbols (e.g., a ninth symbol 704, a tenth symbol 706, and an eleventh symbol 708) which may be or may not be a winning combination. However, this combination of symbols (e.g., ninth symbol 704, tenth symbol 706, and eleventh symbol 708) may trigger a third image 710 (e.g., a person, an animal, a vehicle, etc.) to be displayed (see FIG. 7B). Third image 710 may be a person. Third image 610 may be able to travel on a fifth platform 712 and may have no tools to utilize. In one example, the combination of symbols (e.g., ninth symbol 704, tenth symbol 706, and eleventh symbol 708) is three similar symbols (e.g., Qs).

Figure 7B:
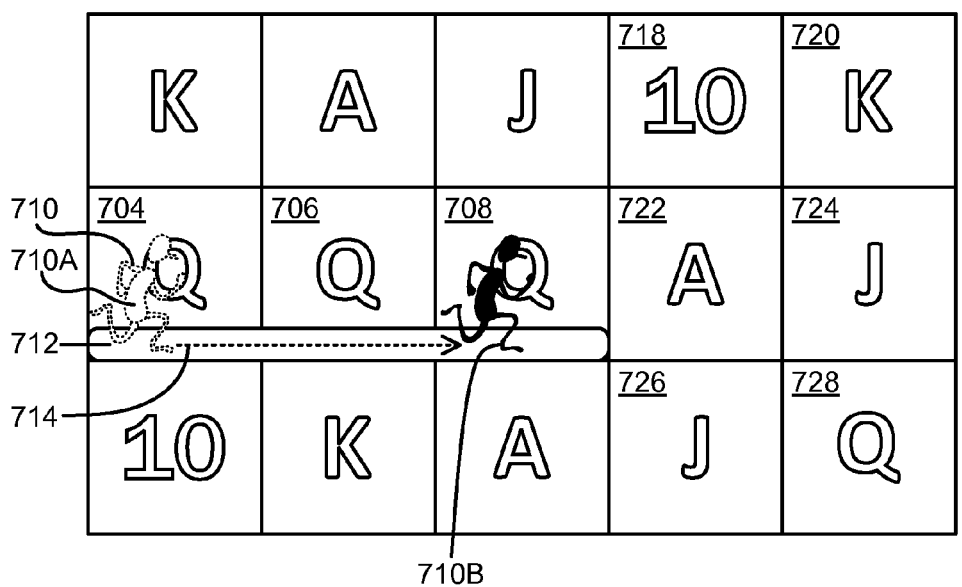
FIG. 7B is another illustration of a platform based game play, according to one embodiment.

FIG. 7B is another illustration of a platform game play, according to one embodiment. In one example, third image 710 may move from a first third image position 710A to a second third image position 710B (e.g., where eleventh symbol 708 is located) via a second path 714. Since third image 710 has no tools, third image 710 may jump to a tenth target 718, an eleventh target 720, a twelfth target 722, a thirteenth target 724, a fourteenth target 726, and/or a fifteenth target 728.

Figure 7C:
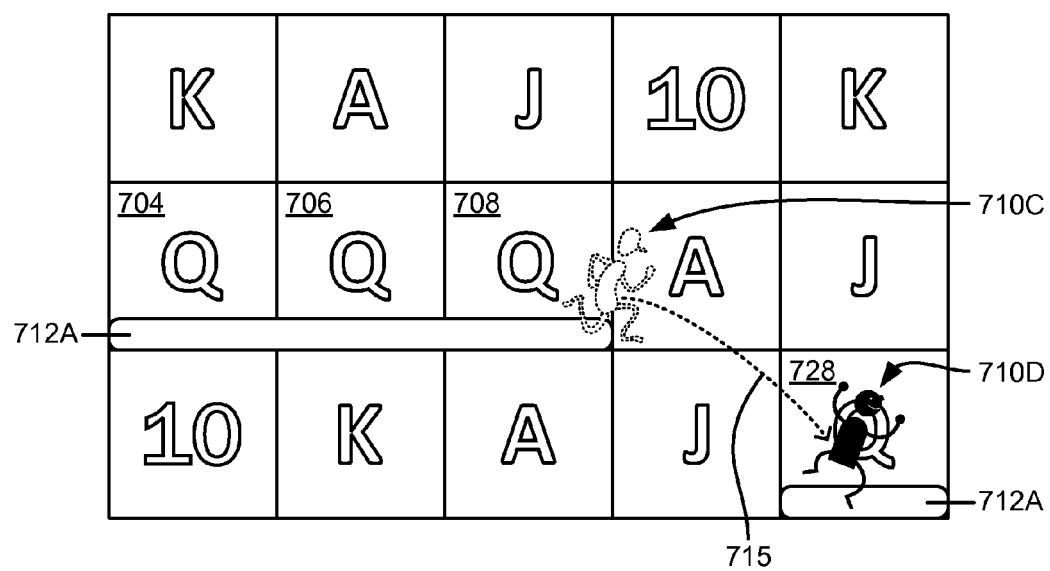
FIG. 7C is another illustration of a platform based game play, according to one embodiment.

FIG. 7C is another illustration of a platform game play, according to one embodiment. In one example, third image 710 may jump to a fourth third image position 710D which may be at a position for fifteenth target 728. Since fifteenth target 728 was a Q, a new combination of symbols may be created. The additional Q symbol (e.g., at fifteenth target 728 position) may extend a symbol combination from a fifth symbol combination (e.g., ninth symbol 704, tenth symbol 706, and eleventh symbol 708) into a sixth symbol combination (e.g., ninth symbol 704, tenth symbol 706, eleventh symbol 708, and fifteenth target 728 (or twelfth symbol)). Fourth symbol combination may be four Qs in a row, which may be a winning symbol combination and/or an increase winning symbol combination (when compared to the third symbol combination).

In another example, if third image 710 had jumped to one or more of tenth target 718, eleventh target 720, twelfth target 722, thirteenth target 724, and/or fourteenth target 726, then third image 710 may have been able to reach one or more of tenth target 718, eleventh target 720, twelfth target 722, thirteenth target 724, and/or fourteenth target 726 without transforming one or more of tenth target 718, eleventh target 720, twelfth target 722, thirteenth target 724, and/or fourteenth target 726 into a symbol which may have created a winning symbol combination and/or an increase winning symbol combination.

In another example, if third image 710 had jumped to one or more of tenth target 718, eleventh target 720, twelfth target 722, thirteenth target 724, and/or fourteenth target 726, then third image 710 may have been able to reach one or more of tenth target 718, eleventh target 720, twelfth target 722, thirteenth target 724, and/or fourteenth target 726 and transformed one or more of tenth target 718, eleventh target 720, twelfth target 722, thirteenth target 724, and/or fourteenth target 726 into a symbol which may have created a winning symbol combination and/or an increase winning symbol combination.

A new platform may be created by the movement of third image 710, which may be a sixth platform 712A.

Figure 8A:
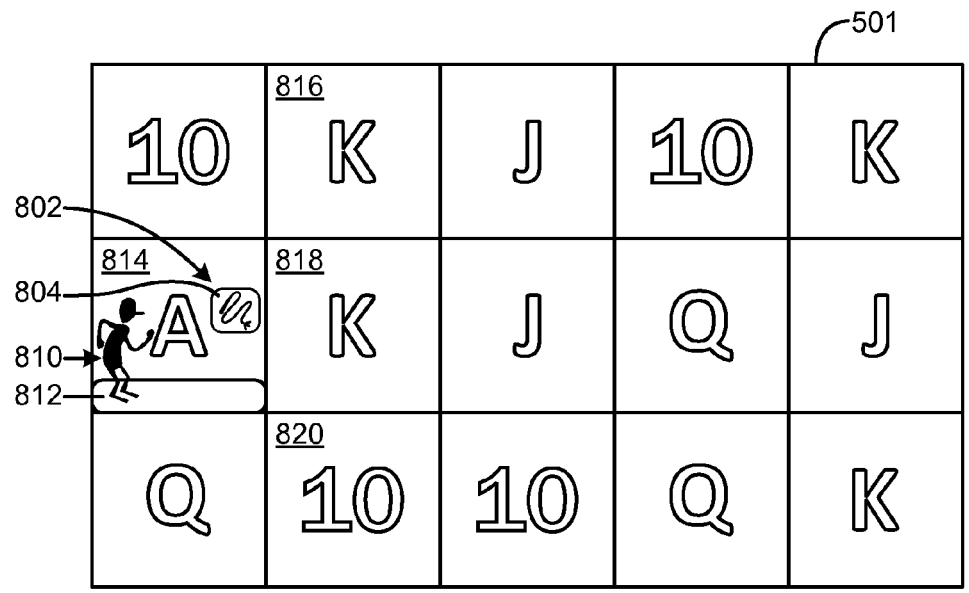
FIG. 8A is an illustration of a platform based game play, according to one embodiment.

FIG. 8A is another illustration of a platform game play, according to one embodiment. A fourth display image 800 may include a fourth image 810, a tool area 802, a first tool 804 (e.g., a whip), and a first platform 812. In one example fourth image 810 (e.g., a person) may select one or more of a first target 816, a second target 818, and a third target 820. However, if fourth image 810 wants to select first target 816, then first tool 804 may need to be utilized. In one example, once first tool 804 is utilized, first tool 804 may not be utilized again. In another example, tools may be utilized any number of times (e.g., 1 to Nth). If fourth image 810 wants to select second target 818, then fourth image 810 may be able to walk (e.g., move) over to second target 818 without utilizing first tool 804. If fourth image 810 wants to select third target 820, then fourth image 810 may have to jump down to third target 820. Fourth display image 800 may have a first ace 814.

In one example, there may be a higher chance of failure when fourth image 810 moves to a location that requires jumping and/or a tool, then when fourth image 810 walks. In another example, any risk factor may be associated with one or more activities. For example, a first risk may be associated with walking, a second risk may be associated with jumping down, a third risk may be associated with jumping up, a fourth risk may be associated with utilizing a latter, and a fifth risk may be associated with utilizing a rope. In this example, first risk<second risk<third risk<fourth risk<fifth risk.

Figure 8B:
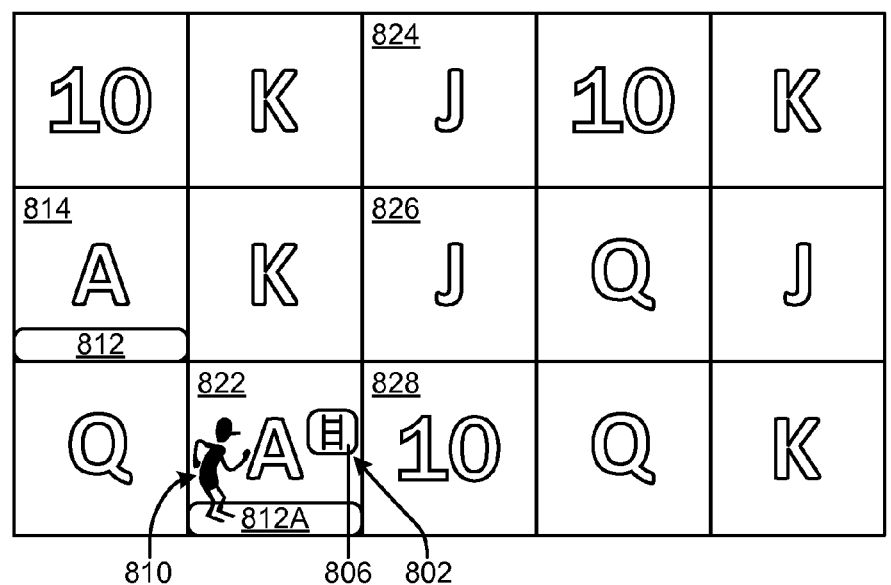
FIG. 8B is another illustration of a platform based game play, according to one embodiment.

FIG. 8B is another illustration of a platform game play, according to one embodiment. In one example, fourth image 810 elects to jump down to third target 820. Therefore, first tool 804 may be saved for another target. In one example, third target 820 may be transformed into a second ace 822. In another example, third target 820 may not have been transformed into another ace and the game play may have ended.

In one example, at third target 820 position a second tool 806 may be available in tool area 802. In one example, second tool 806 is a latter. In one example, fourth image 810 (e.g., a person) may select one or more of a fourth target 824, a fifth target 826, and a sixth target 828. However, if fourth image 810 wants to select fourth target 824, then first tool 804 may need to be utilized. In one example, once first tool 804 is utilized, first tool 804 may not be utilized again. If fourth image 810 wants to select fifth target 826, then second tool 806 may need to be utilized. In one example, once second tool 806 is utilized, second tool 806 may not be utilized again. If fourth image 810 wants to select sixth target 828, then first image 810 may be able to walk over to sixth target 828. In other embodiment, the tools may be utilized more than once.

Figure 8C:
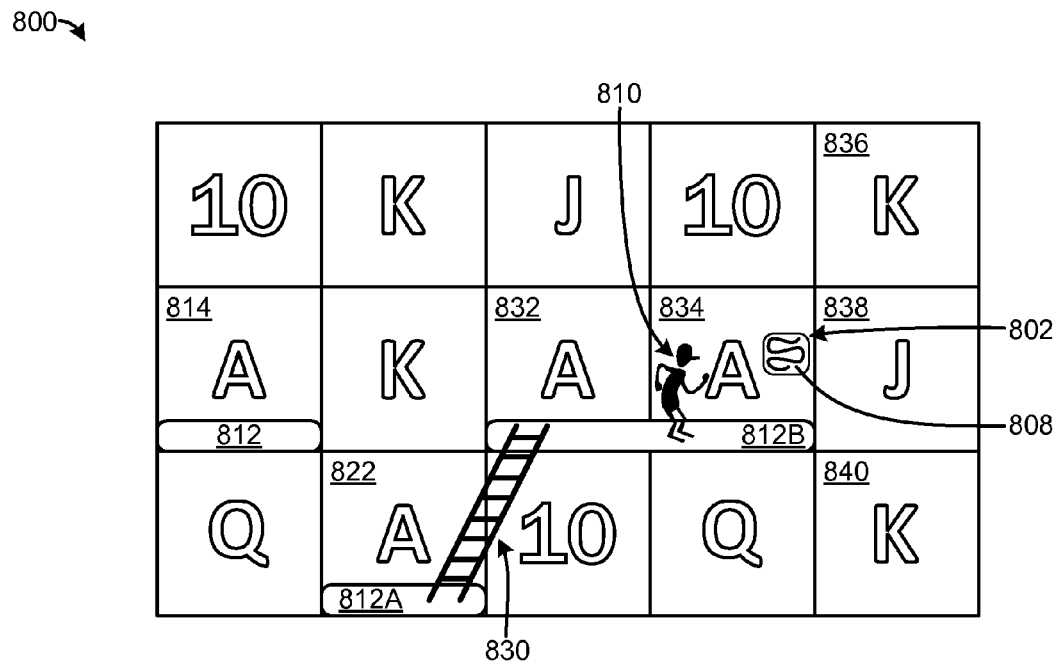
FIG. 8C is another illustration of a platform based game play, according to one embodiment.

FIG. 8C is another illustration of a platform game play, according to one embodiment. In one example, fourth image 810 elects to utilize second tool 806 to select fifth target 826. Therefore, first tool 804 may be saved for another target but second tool 806 may not be utilized again. In one example, fifth target 826 may be transformed into a third ace 832. In another example, fifth target 826 may not have been transformed into another ace and the game play may have ended.

Fourth image 810 may have elected to walk over to another symbol space, which may be transformed into a fourth ace 834. In one example, a third tool 808 (e.g., rope) may be found in tool area 802.

Figure 8D:
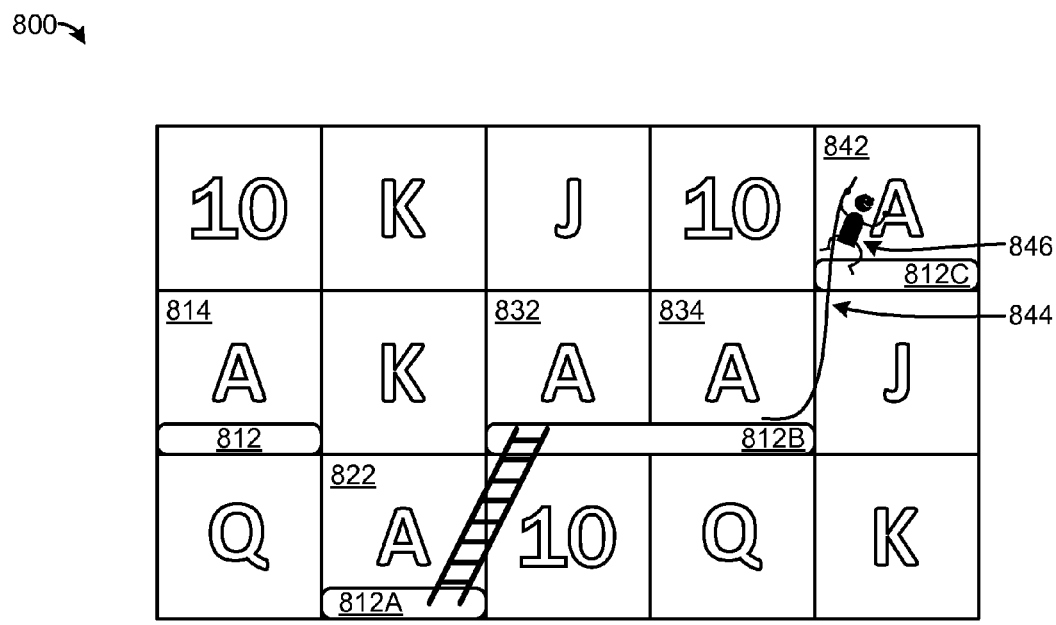
FIG. 8D is another illustration of a platform based game play, according to one embodiment.

FIG. 8D is another illustration of a platform game play, according to one embodiment. In one example fourth image 810 (e.g., a person) may select one or more of a seventh target 836, an eighth target 838, and a ninth target 840. In one example, fourth image 810 may utilize third tool 808 to select seventh target 836. Seventh target 836 may be transformed into a five ace 842. A winning combination of first ace 814, second ace 822, third ace 832, fourth ace 834, and fifth ace 842 may be generated.

Figure 9A:
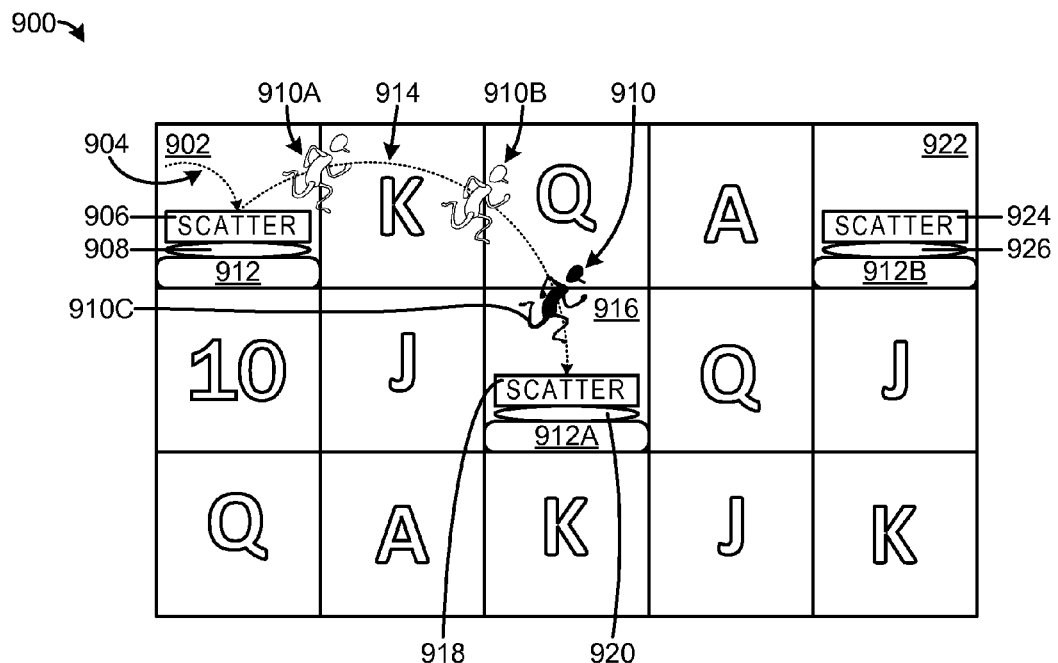
FIG. 9A is an illustration of a platform based game play, according to one embodiment.

FIG. 9A is another illustration of a platform game play, according to one embodiment. A fifth display image 900 may include a first scatter symbol 906, a second scatter symbol 918, and a third scatter symbol 924. First scatter symbol 906 may have a first trampoline 908 associated with first scatter symbol 906. Second scatter symbol 918 may have a second trampoline 920 associated with second scatter symbol 918. Third scatter symbol 924 may have a third trampoline 926 associated with third scatter symbol 924. In one example, a first platform 912 may be associated with first scatter symbol 918 and/or a first symbol 902. In another example, a second platform 912A may be associated with second scatter symbol 918 and/or a second symbol 916. In another example, a third platform 912B may be associated with third scatter symbol 924 and/or a third symbol 922.

In one example, fifth image 910 (e.g., a person) may jump via input (e.g., player, electronic gaming device 100, and/or electronic gaming system 200) from first scatter symbol 918 utilizing first trampoline 908 to second scatter symbol 918 and/or second trampoline 920. In one example, fifth image 910 may jump via a first path 914 which may include a first position 910A, a second position 910B, and a third position 910C.

It should be noted that these scatter symbols (or any other symbol) may have any item (e.g., trampoline, whip, rope, vehicle, animal, gun, etc.) associated with these scatter symbols (or any other symbol)

Figure 9B:
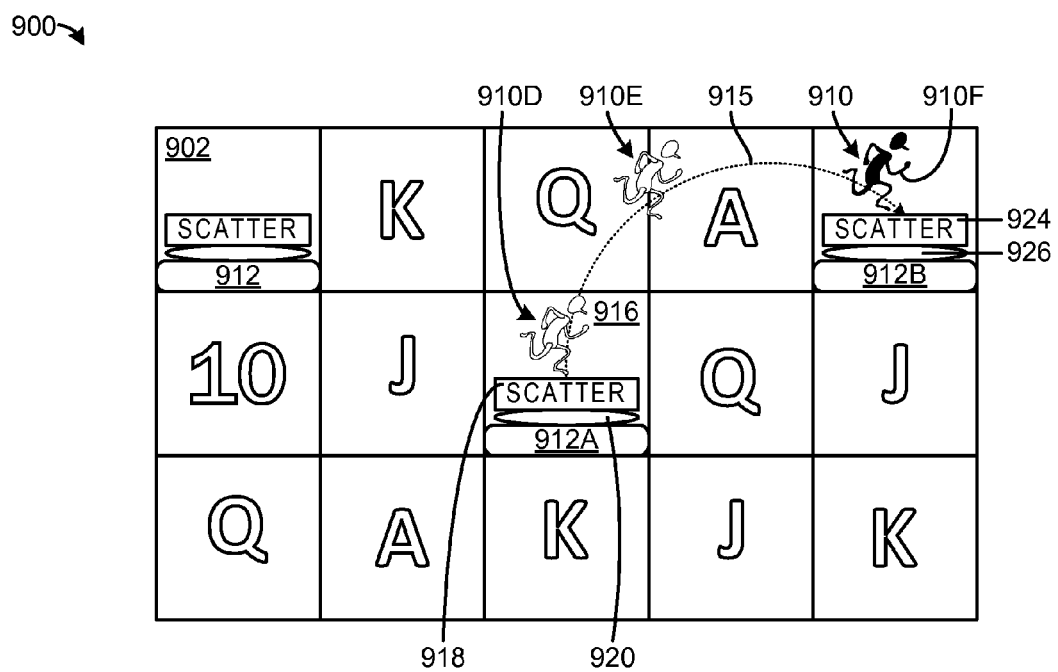
FIG. 9B is another illustration of a platform based game play, according to one embodiment.

FIG. 9B is another illustration of a platform game play, according to one embodiment. In one example, fifth image 910 (e.g., a person) may jump via input (e.g., player, electronic gaming device 100, and/or electronic gaming system 200) from second scatter symbol 918 utilizing second trampoline 920 to third scatter symbol 924 and/or third trampoline 926. In one example, fifth image 910 may jump via a second path 915 which may include a fourth position 910D, a fifth position 910E, and a sixth position 910F. The movement from scatter to scatter may have generated one or more winning events.

Figure 10A:
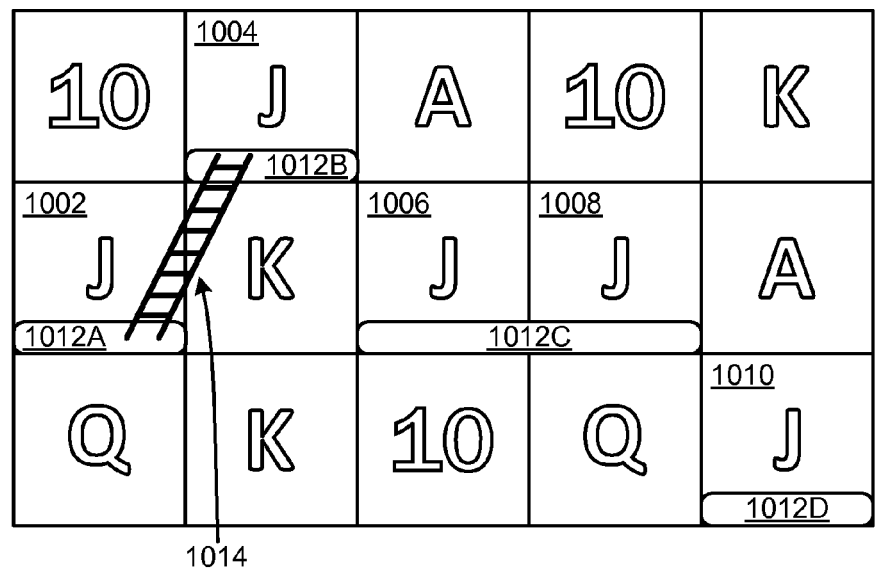
FIG. 10A is an illustration of a platform based game play, according to one embodiment.

FIG. 10A is another illustration of a platform game play, according to one embodiment. A sixth display image 1000 may include five symbols (e.g., J) in a row. The five symbols are a first symbol 1002, a second symbol 1004, a third symbol 1006, a fourth symbol 1008, and a fifth symbol 1010. In one example, by obtaining a predetermined number (e.g., 1, 2, 3, 4, 5, etc.) of symbols in a predetermined order (e.g., payline), one or more free spins may be awarded, a player's level may be increased, a multiplier may be award, and/or any combination thereof. The one or more free spins may be a total respin (e.g., all the reels) and/or a partial respin (e.g., less than all of the reels are respun). In one example, a tool 1014 (e.g., a latter) may be utilized to obtain the five symbols in a predetermined pattern. For example, sixth image 1000 may have utilized tool 1014 to climb from first symbol 1002 to second symbol 1004. Sixth image 1000 may have jumped down from second symbol 1004 to third symbol 1006. Sixth image 1000 may have walked from third symbol 1006 to fourth symbol 1008. Sixth image 1000 may have jumped down from fourth symbol 1008 to fifth symbol 1010.

Figure 10B:
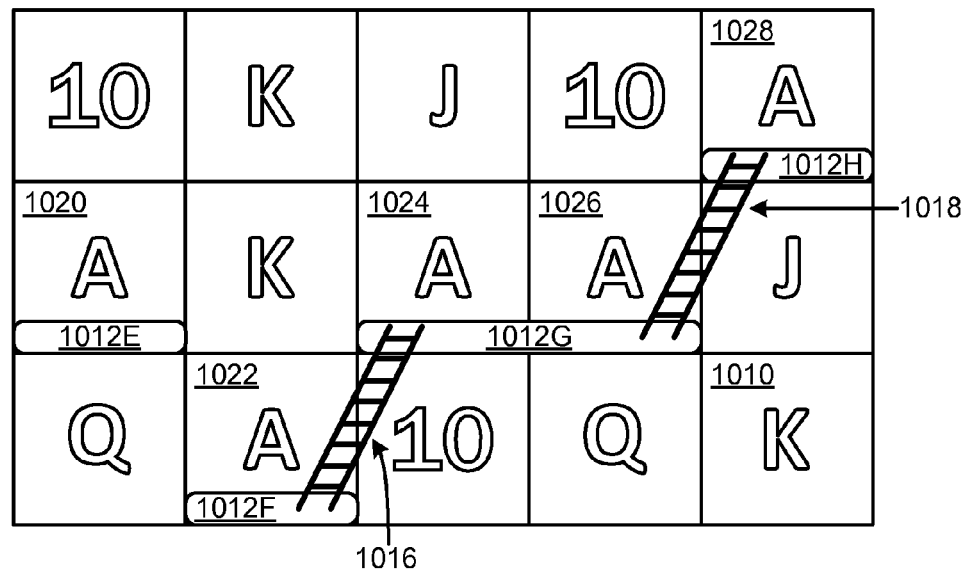
FIG. 10B is another illustration of a platform based game play, according to one embodiment.

FIG. 10B is another illustration of a platform game play, according to one embodiment. Sixth image 1000 may include five symbols (e.g., A) in a row. The five symbols are a sixth symbol 1020, a seventh symbol 1022, an eighth symbol 1024, a ninth symbol 1026, and a tenth symbol 1028. In one example, by obtaining a predetermined number (e.g., 1, 2, 3, 4, 5, etc.) of symbols in a predetermined order (e.g., payline), one or more free spins may be awarded, a player's level may be increased, a multiplier may be award, and/or any combination thereof. The one or more free spins may be a total respin (e.g., all the reels) and/or a partial respin (e.g., less than all of the reels are respun). In one example, a first tool 1016 (e.g., a first latter) and a second tool 1018 (e.g., a second latter) may be utilized to obtain the five symbols in a predetermined pattern. In one example, the game play is at a level two game play which may increase the awards generated. In one example, an awards area 1030 displays a game play level. In this example, the game play level may be indicated by a message 1032, which states "2× Multiplier." For example, sixth image 1000 may have jumped down from sixth symbol 1020 to seventh symbol 1022. Sixth image 1000 may have utilized first tool 1016 to climb up from seventh symbol 1022 to eighth symbol 1024. Sixth image 1000 may walk from eighth symbol 1024 to ninth symbol 1026. Sixth image 1000 may have utilized second tool 1018 to climb up from ninth symbol 1026 to tenth symbol 1028.

Figure 10C:
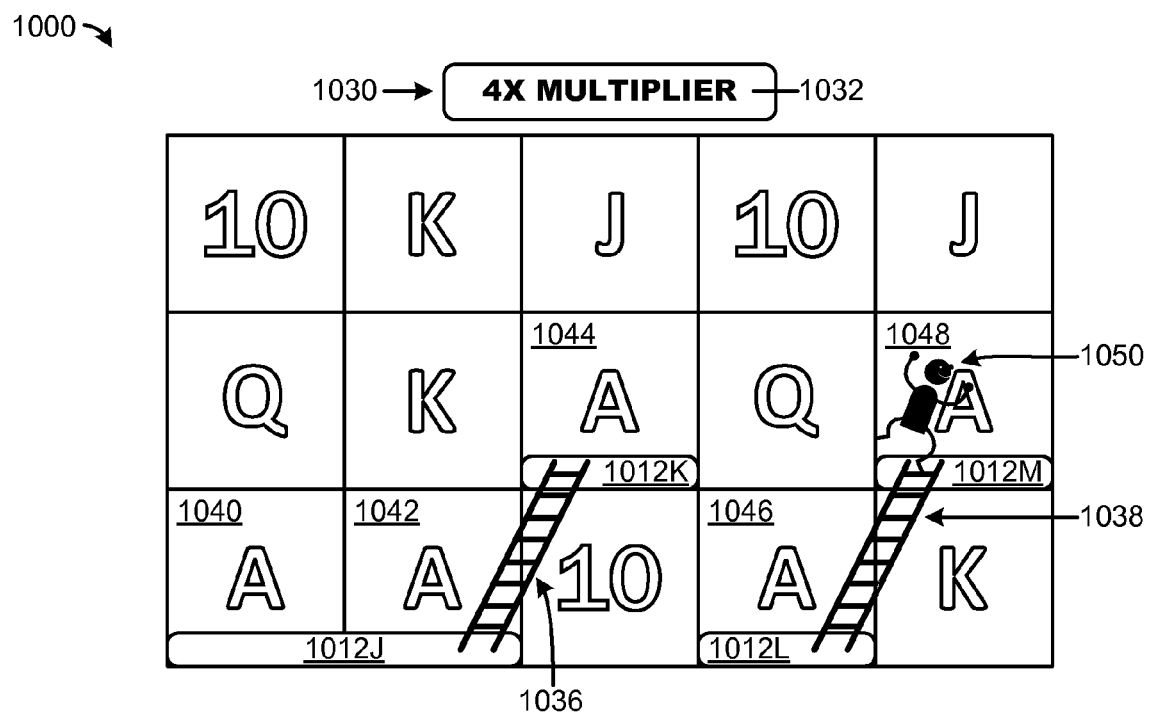
FIG. 10C is another illustration of a platform based game play, according to one embodiment

FIG. 10C is another illustration of a platform game play, according to one embodiment. Sixth image 1000 may include five symbols (e.g., A) in a row. The five symbols are an eleventh symbol 1040, a twelfth symbol 1042, a thirteenth symbol 1044, a fourteenth symbol 1046, and a fifteenth symbol 1048. In one example, by obtaining a predetermined number (e.g., 1, 2, 3, 4, 5, etc.) of symbols in a predetermined order (e.g., payline), one or more free spins may be awarded, a player's level may be increased, a multiplier may be award, and/or any combination thereof. The one or more free spins may be a total respin (e.g., all the reels) and/or a partial respin (e.g., less than all of the reels are respun). In one example, a first tool 1036 (e.g., a first latter) and a second tool 1038 (e.g., a second latter) may be utilized to obtain the five symbols in a predetermined pattern. In one example, the game play is at a level three game play which may increase the awards generated. In one example, an awards area 1030 displays a game play level. In this example, the game play level may be indicated by message 1032, which states "4× Multiplier."

Figure 11A:
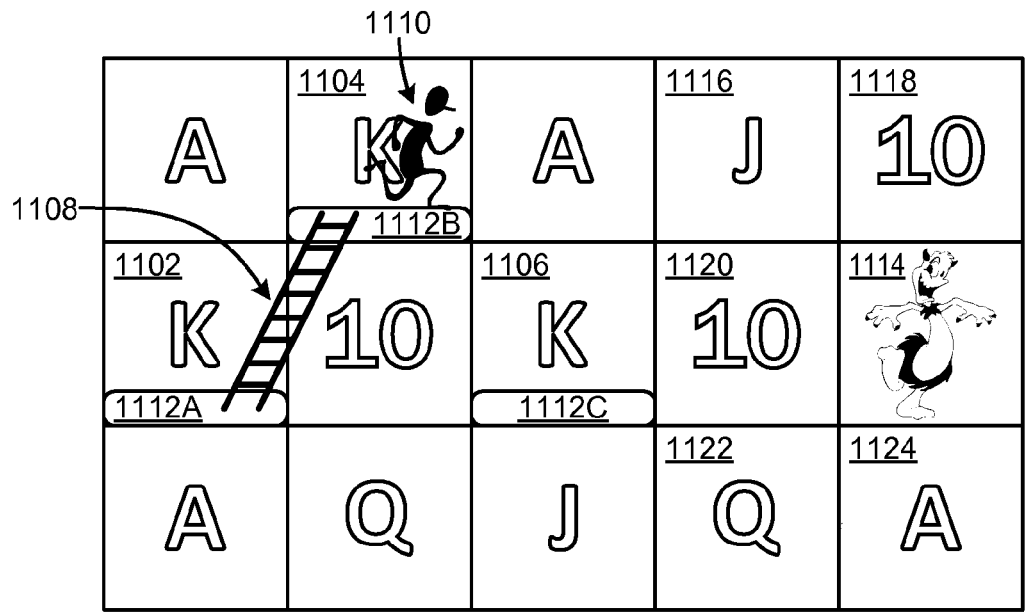
FIG. 11A is an illustration of a platform based game play, according to one embodiment.

FIG. 11A is another illustration of a platform game play, according to one embodiment. In one example, a tenth display image 1100 may include a sixth image 1110 (e.g., a person), which may travel over a first symbol 1102 to a second symbol 1104 via a first tool 1108. Tenth display image 1100 may include a first expandable symbol 1116, a second expandable symbol 1118, a third expandable symbol 1120, a boss symbol 1114, a fourth expandable symbol 1122, and/or a fifth expandable symbol 1124.

Figure 11B:
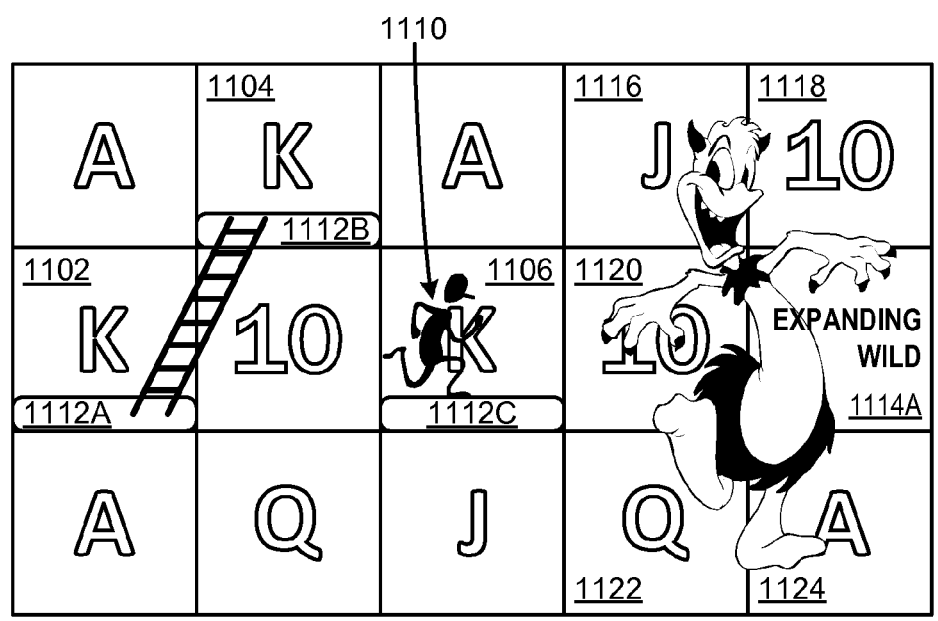
FIG. 11B is another illustration of a platform based game play, according to one embodiment.

FIG. 11B is another illustration of a platform game play, according to one embodiment. Tenth display image 1100 may include sixth image 1110 moving to a third symbol 1106 location. Once sixth image 1110 is located at third symbol 1106 location, boss symbol 1114 may expand to cover one or more of first expandable symbol 1116 location, second expandable symbol 1118 location, third expandable symbol 1120 location, boss symbol 1114 location, fourth expandable symbol 1122 location, and/or fifth expandable symbol 1124 location.

Figure 11C:
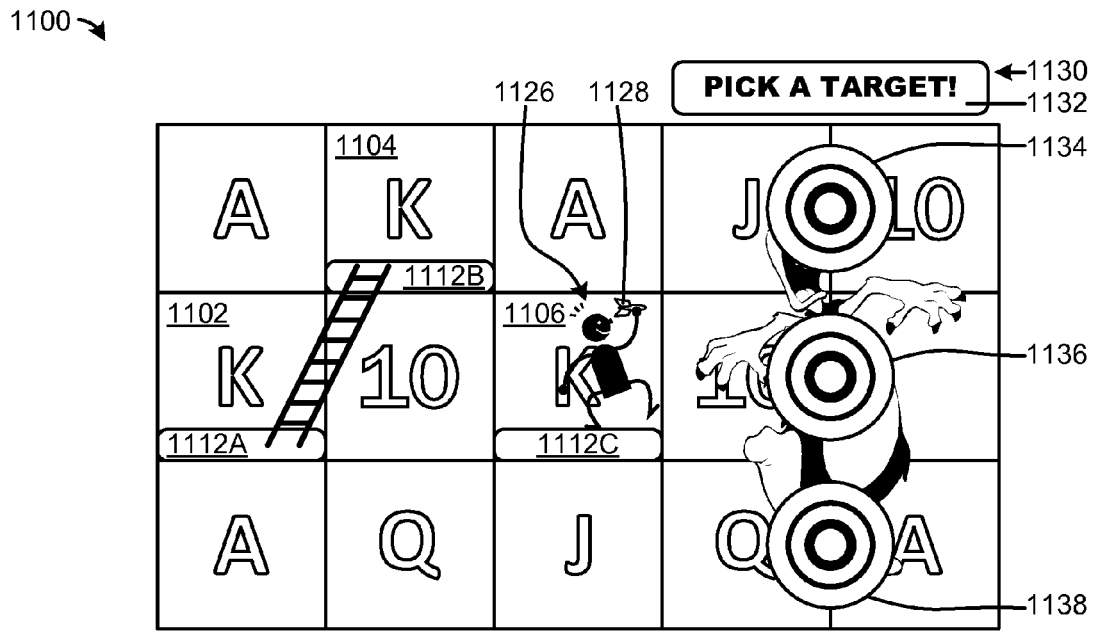
FIG. 11C is another illustration of a platform based game play, according to one embodiment.

FIG. 11C is another illustration of a platform game play, according to one embodiment. Once boss symbol 1114 expands to cover one or more of first expandable symbol 1116 location, second expandable symbol 1118 location, third expandable symbol 1120 location, boss symbol 1114 location, fourth expandable symbol 1122 location, and/or fifth expandable symbol 1124 location, one or more targets may appear. In one example, a first target 1134, a second target 1136, and a third target 1138 may appear. In one example, message area 1130 may include message 1132 which may state "Pick A Target." Sixth image 1110 may have a first tool 1128 (e.g., dart) to select the one or more targets.

Figure 11D:
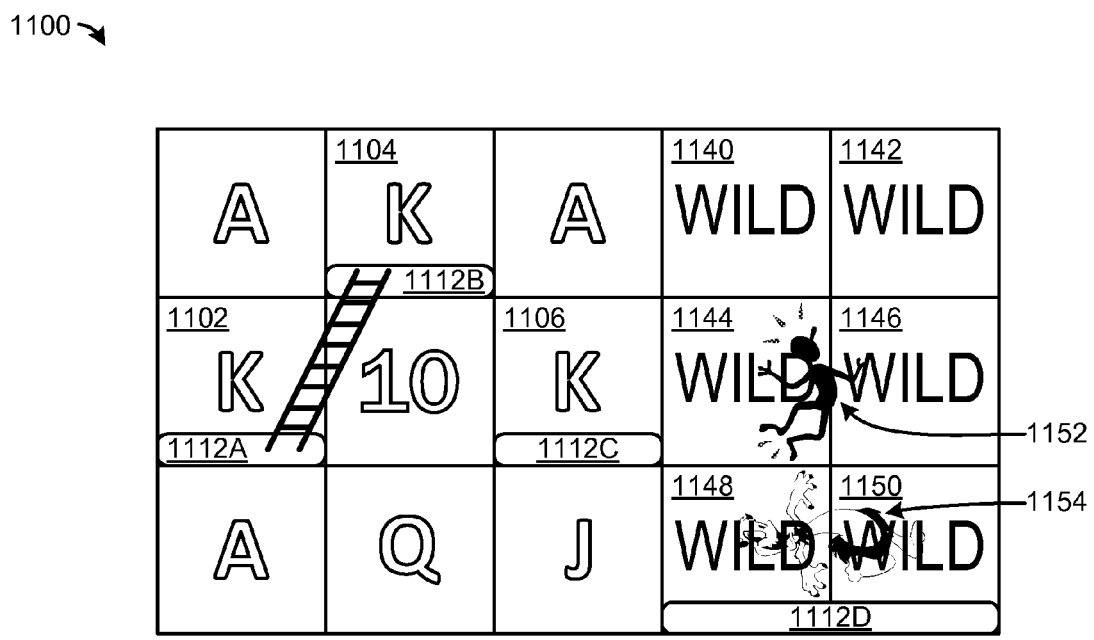
FIG. 11D is another illustration of a platform based game play, according to one embodiment.

FIG. 11D is another illustration of a platform game play, according to one embodiment. Sixth image 1110 may utilize first tool 1128 to select second target 1136, which may defeat a boss image. By defeating boss image, a boss defeated image 1154, a winner image 1152, and/or expanding wild symbols may appear in one or more first expandable symbol 1116 location, second expandable symbol 1118 location, third expandable symbol 1120 location, boss symbol 1114 location, fourth expandable symbol 1122 location, and/or fifth expandable symbol 1124 location.

Figure 12:
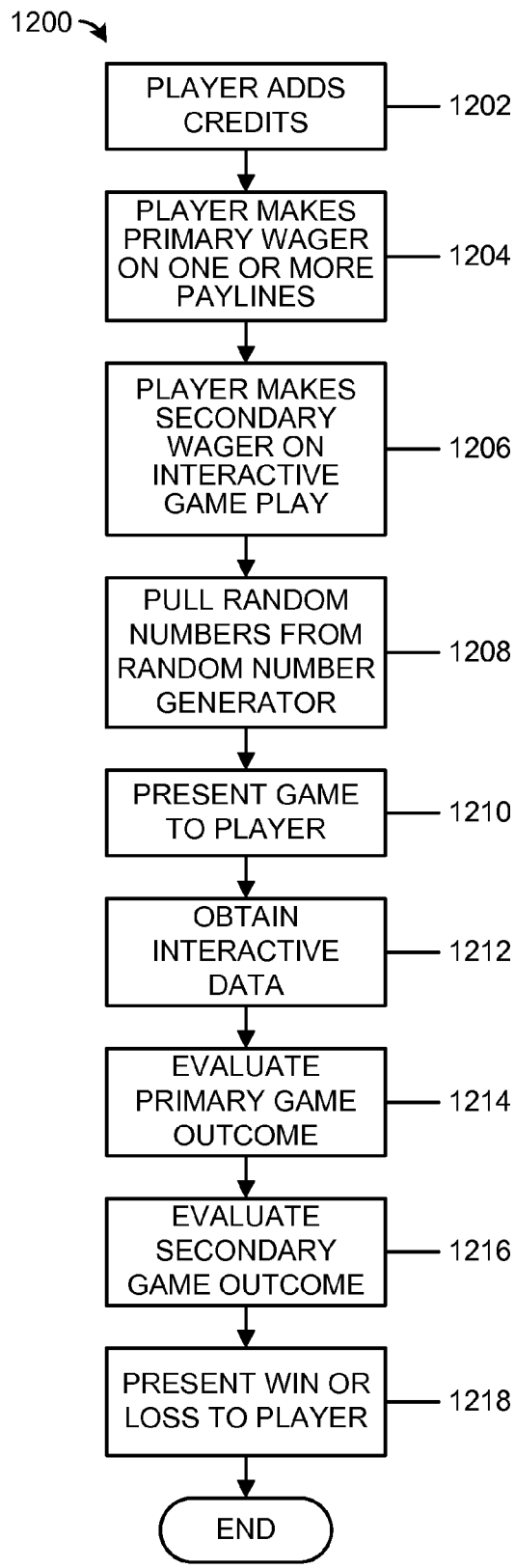
FIG. 12 is a flow diagram for game play, according to one embodiment.

FIG. 12 is a flow chart 1200 for game play, according to one embodiment. The method may include the player adding credits (step 1202). The method may include the player making one or more primary wagers on one or more paylines (step 1204). The method may include the player making one or more secondary wagers on one or more interactive game plays (step 1206). The method may include pulling one or more random numbers from a random number generator (step 1208). The method may include presenting the game to the player (step 1210). The method may include obtaining interactive data (step 1212). The method may include evaluating primary game outcome (step 1214). The method may include evaluating second game outcome (step 1216). The method may include presenting a winning or losing results to the player (step 1218). The method may end.

Figure 13:
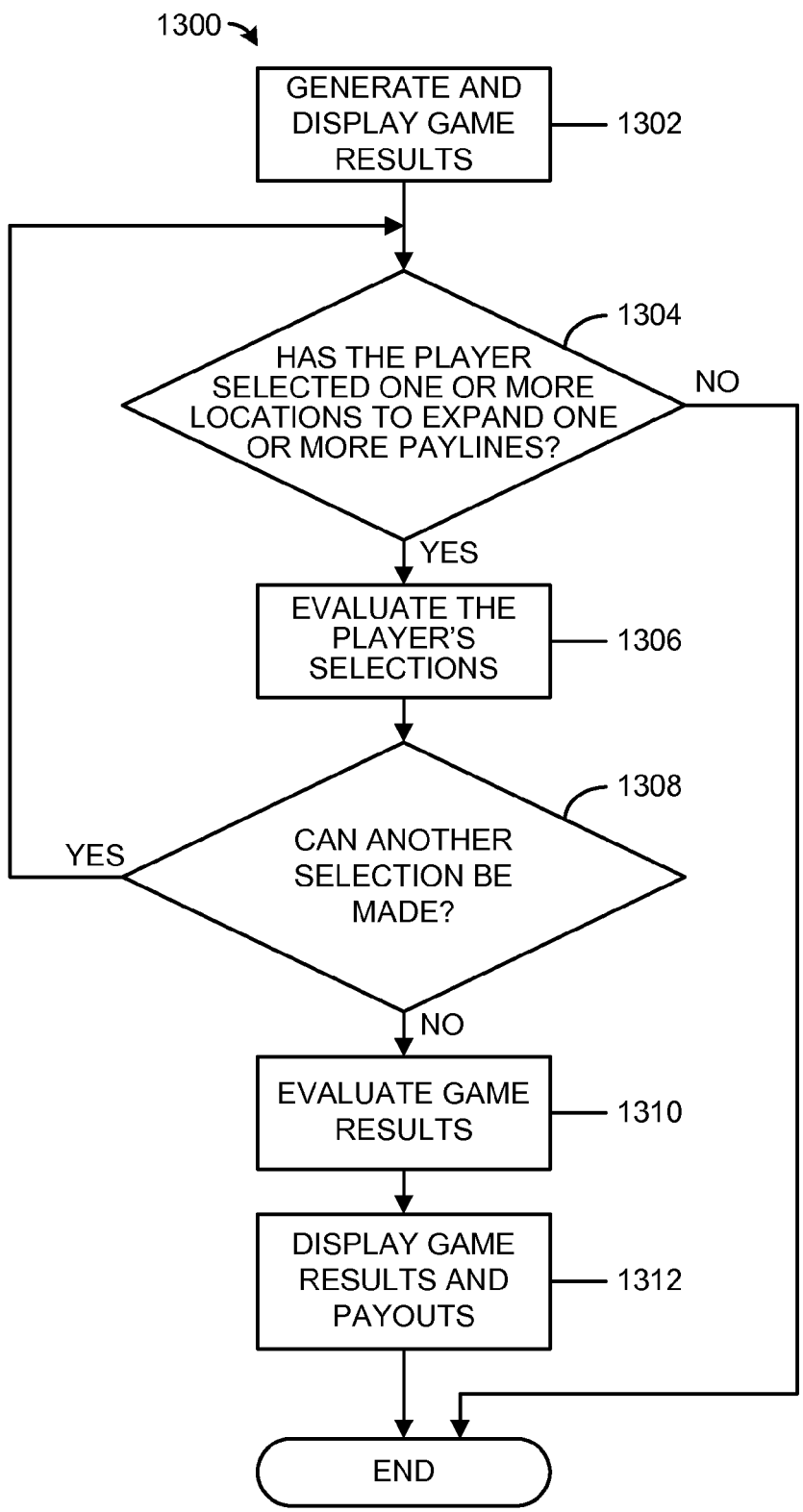
FIG. 13 is another flow diagram for game play, according to one embodiment.

FIG. 13 is a flow diagram for game play 1300, according to one embodiment. The method may include generating and displaying game results (step 1302). The method may include electronic gaming device 100 and/or electronic gaming system 200 determining whether the player has selected one or more locations to expand one or more paylines (step 1304). If the player has not selected one or more locations to expand one or more paylines, then the method may end. If the player has selected one or more locations to expand one or more paylines, then the method may evaluate the one or more selections made by the player (step 1306). The method may include electronic gaming device 100 and/or electronic gaming system 200 determining whether another selection may be made (step 1308). If another selection may be made, the method moves back to step 1304. If another selection may not be made, the method may evaluate the game results (step 1310). The method may display the game results and payouts (step 1312) and the method may end.

For example, a selection of a first target may be made, which results in the first target not being modified and/or the first target being a stopper. This selection may end the platform game. In another example, a selection of a first target may be made, which results in the first target being modified into a winning symbol and/or another turn award. In this example, another selection may be made. Further, a predetermined number of selections may be allowed to be made.

One or more presentations may be based on a first theme (e.g., pirates), a second theme (e.g., cars), a third theme (e.g., horses), a fourth theme (e.g., perceived skill), a fifth theme (e.g., a specific movie), a sixth theme (e.g., a sporting event), a seventh theme (e.g., outer space), an eight theme (e.g., flowers), a ninth theme (e.g., food), a tenth theme (e.g., a skill based presentation), an eleventh theme (e.g., trivia), a twelve theme (e.g., pick a bonus), a thirteenth theme (e.g., ghost), a fourteenth theme (e.g., natural events), on a fifteenth theme (e.g., a mineral—gold, silver, etc.), and/or a sixteenth theme (e.g., mythology). One, a few, a plurality, and/or all of these presentations may be themed based.

Figure 14:
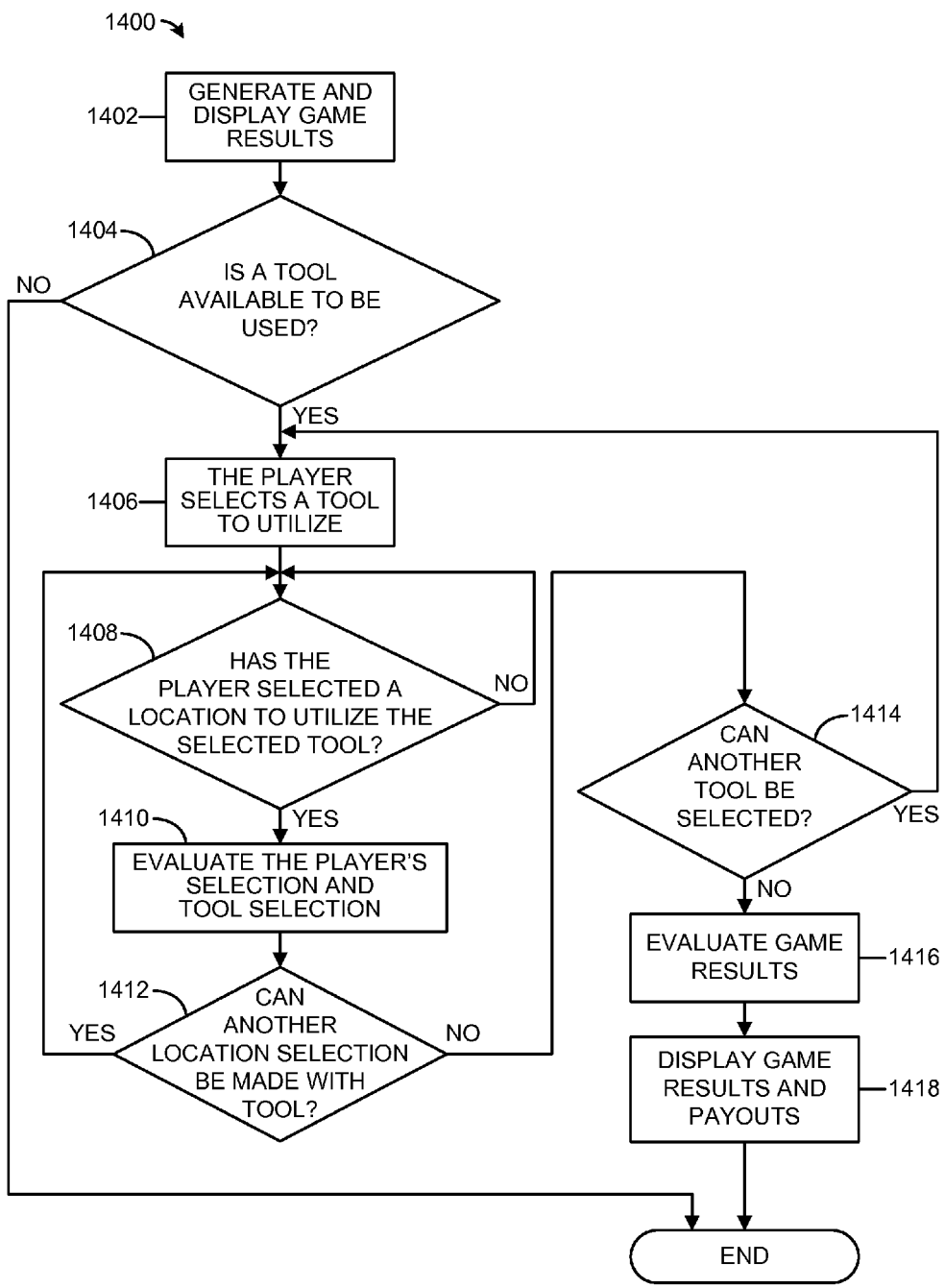
FIG. 14 is another flow diagram for game play, according to one embodiment.

In FIG. 14, a flow diagram for game play 1400 is shown, according to one embodiment. The method may include the game starting. The method may include generating and displaying game results (step 1402). The method may include electronic gaming device 100 and/or electronic gaming system 200 determining whether a tool is available to be utilized (step 1404). If no tool is available to be utilized, then the method may end. If a tool is available to be utilized, then the method may include the player selecting a tool to utilize (step 1406). The method may include electronic gaming device 100 and/or electronic gaming system 200 determining whether the player has selected a location to utilize the selection tool at (step 1408). If the player has not selected a location to utilize the tool, the method may return to step 1408 and/or prompt the player to make a location selection. If the player has selected a location to utilize the tool, the method may evaluate the player's location selection and tool selection (step 1410). The method may include electronic gaming device 100 and/or electronic gaming system 200 determining whether another location selection may be made with the tool (step 1412). If another location selection may be made with the tool, then the method may return to step 1408. If another location selection may not be made with the tool, then the method may include electronic gaming device 100 and/or electronic gaming system 200 determining whether another tool may be selected (step 1414). If another tool may be selected, then the method moves back to step 1406. If another tool may not be selected, then the method may include evaluating the game results (step 1416). The method may include displaying the game results and payouts (step 1418) and the method may end.

Figure 15:
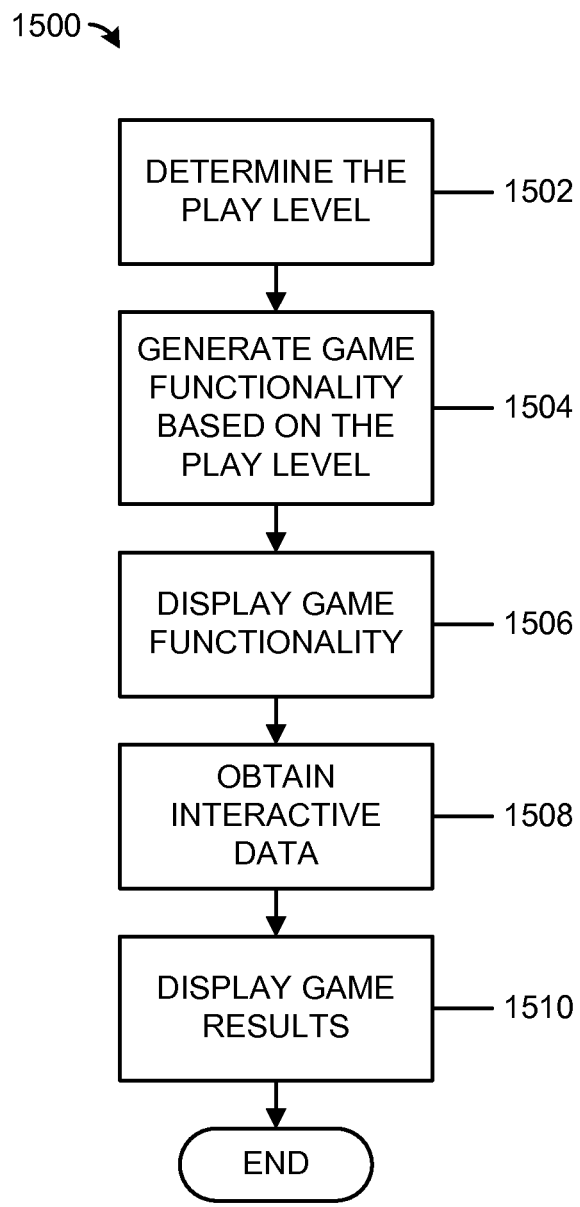
FIG. 15 is another flow diagram for game play, according to one embodiment.

FIG. 15 is a flowchart 1500 for game play, according to one embodiment. The method may include determining the play level (step 1502). The method may include generating a game functionality based on the play level (step 1504). The method may include displaying the game functionality (step 1506). The method may include obtaining interactive data (step 1508). The method may include displaying game results (step 1510) and the method may end.

For example, when a game play is at a level one, a first interactive data may result in a non-winning and/or a non-positive result. However, when a game play is at a level two, the same first interactive data may result in a winning and/or a positive result.

In another example, when a game play is at a level one, a first interactive data may result in a winning and/or a positive result. However, when a game play is at a level two, the same first interactive data may result in a non-winning and/or a non-positive result.

In one example, the method may include determining a triggering event (e.g., a winning credit amount). The method may include looking up one or more presentations relating to the triggering event (e.g., a winning credit amount). The method may include selecting one or more presentations from the one or more presentations related to the triggering event (e.g., a winning credit amount) based on one or more criteria. The method may include displaying the selected one or more presentations. The method may end.

In one example, the system and/or method may determine that a key value (e.g., winning amount) is 10,000 credits. The key value may be the amount of credits (and/or multipliers and/or free spins and/or any other item of value) won. In this example, the 10,000 credit key value number may be utilized to determine one or more presentations associated with this 10,000 credits key value number. There may be presentation indexes numbered 0 to N associated with the 10,000 credits key value number.

The system and/or method may select (e.g., randomly, by a predetermined pattern, shuffle, combination thereof, and/or any other selection method) one or more of the presentations based on the key value.

In one example, the method may include determining a winning credit amount. The method may include looking up one or more presentations related to the winning credit amount. The method may include modifying the set of presentations relating to the winning credit amount based on one or more criteria. The method may include selecting a presentation from the modified set of presentations based on one or more criteria. The method may include displaying the selected presentation. The method may end.

For example, the presentation may be modified to include an advertisement, a movie trailer, a movie promotion, a casino event, a casino promotion, an actor's image, the player's image, etc.

In one embodiment, the electronic gaming device may include a plurality of reels, one or more paylines formed on at least a portion of the plurality of reels, a memory, and a processor. The memory may include a presentation module. The presentation module may include a plurality of presentations. The processor may determine a value. The processor may select one or more presentations based on the value.

In another example, the processor may randomly select the one or more presentations related to the value. In an example, the processor may select the one or more presentations related to the value in a predetermined pattern.

In another example, the value may be based on an input from a player. In an example, the processor may display a presentation based on one or more presentations. In another example, the processor may display a themed presentation based on one or more criteria. In an example, the themed presentation may be based on an advertisement and/or any other theme.

In another embodiment, the method of providing gaming options via an electronic gaming device may include receiving one or more primary wagers on one or more paylines, starting a bonus game, determining one or more values, and/or selecting one or more presentations based on the one or more values.

In an exemplary embodiment, an electronic gaming device may include a plurality of reels. The plurality of reels may include a plurality of symbols. The electronic gaming device may include a first payline, a second payline, and a memory. The memory may include a payline module. The payline module may include a plurality of payline structures. The electronic gaming device may include a processor. The processor may receive primary wagers on one or more paylines. The processor may receive one or more secondary wagers on one or more selected paylines (e.g., repeat paylines, patterns, scenarios, etc.). The selected paylines may be based on data received from a player. The processor may determine a selected payline's payout based on the one or more selected paylines (e.g., repeat paylines, patterns, scenarios, etc.).

In another example, the display may shade one or more non-selected paylines. The electronic gaming device may include a player preference input device. The player preference input device may modify a game configuration based on data from an identification device. The processor may multiply a prize value based on a selected payline occurrence.

In another example, the method may include obtaining a player preference data and modifying a game configuration based on the player preference data. The method may include receiving data from at least one of a server and one or more gaming devices.

In another example, the processor may determine a payout based on the primary wagers. The processor may receive one or more secondary wagers on one or more patterns. The electronic gaming device may include a display, which may display a game status image.

In another embodiment, the electronic gaming system may include a server. The server may include a server memory, a server processor, and a signage server. The server memory may include historical gaming data. The server processor may generate a gaming message based on the historical gaming data. The signage server may transmit the gaming message.

In another example, the gaming message may be transmitted to an internal display of a gaming entity. The internal display may be a non-gaming device display. The gaming message may be transmitted to an external display of a gaming entity. The external display may be located outside of a gaming entity. The gaming message may be transmitted to at least one of a top display, a main display, and a side display.

The plurality of reels may form a 5-by-5 matrix, a 3-by-5 matrix, a 4-by-5 matrix, a 4-by-3 matrix, a 5-by-3 matrix, or any number-by-any number matrix. The symbols may be an image of a card, an image, and/or other objects. For example, it could be a pot of gold, an ace of spades, a diamond, or any other symbol. The symbols may be animation. The symbols may be a picture. For example, it may be a picture of the player as taken by camera 312. The symbols may be a number. The symbols may be any image. The symbols may be blank.

The disclosed features may be part of the base game and/or a bonus game. In addition, the disclosed features may be part of a base bet and/or may require an additional side bet (e.g., ante bet).

In one embodiment, the electronic gaming device may include a plurality of reels. The one or more paylines may be formed on at least a portion of the plurality of reels. The electronic gaming device may include a memory. The memory may include one or more platform game play structures. The electronic gaming device may include a processor. The processor may initiate the one or more platform game play structures based on one or more triggering events.

In another example, the one or more initiated platform game play structures may be based on one or more characteristics of the one or more triggering events. In another example, the processor may display a first game event. In another example, the first game event may include one or more first game event options. In one example, the processor may receive one or more selections relating to the one or more first game event options. In one example, the processor may display a second game event based on the one or more selections relating to the one or more first game event options.

In another example, the second game event may include one or more second game event options. In another example, the processor may receive one or more selections relating to the one or more second game event options. In another example, the processor may display a third game event based on the one or more selections relating to the one or more second game event options In one embodiment, the method of providing gaming options via an electronic gaming device may include receiving one or more wagers on one or more paylines. The method may include determining one or more triggering events. The method may include displaying one or more platform game play structures.

In another example, the method may include initiating the one or more initiated platform game play structures based on one or more characteristics of the one or more triggering events. In one example, the method may include displaying a first game event. In another example, the first game event may include one or more first game event options. In one example, the method may include receiving one or more selections relating to the one or more first game event options.

In another example, the method may include displaying a second game event based on the one or more selections relating to the one or more first game event options. The second game event may include one or more second game event options. In another example, the method may include receiving one or more selections relating to the one or more second game event options.

In one example, the method may include displaying a third game event based on the one or more selections relating to the one or more second game event options.

In one embodiment, the electronic gaming system may include a server. The server may include a server memory and a server processor. The server memory may include one or more platform game play structures. The server processor may initiate the one or more platform game play structures based on a triggering event.

In another example, the server processor may display a first game event.

In one embodiment, the system and/or methods may have no symbol substitution. In this example, the symbols land on various areas of the matrix and one or more of the paying symbols form the navigable terrain and the actor moves along that terrain. Scatter symbols (FIG. 9A) and wraparound math rules (FIG. 7C) may be utilized to enhance game play. In this example, electronic gaming device 100 and/or electronic gaming system 200 may control the Actor. In this example, the player may hit the spin button and watch the Actor perform via electronic gaming device 100 and/or electronic gaming system 200.

In another embodiment, the system and/or method may have one or more bonus triggering events. These events may move an actor across the reels and/or uncovering particular elements (e.g., a special bonus symbol), which may trigger a bonus.

In another example, a series of bonus scatter symbol may present a jumping option to an actor (FIG. 9A) to enter a bonus game, but this bonus game may only be initiated if the necessary number (e.g., 3) of bonus scatter symbols are present. For a person image this might be a spring, for a vehicle image it might be a ramp and/or some kind of power-up like a jet pack. Presenting less than the required symbols to trigger the bonus may provide an anticipation element leading to a navigation debacle (e.g., a character springs and falls, a vehicle crash and burns, etc.).

In another example, a special wild symbol on the navigable terrain may pay additional scatter pay and/or a multiplier to the line win. In another example, a 5-of-a-Kind and/or any way an Actor may get across the full set of reels may trigger a "level up" mechanic where the next spin has a multiplier, i.e. a normal game and/or a free spin with a multiplier (FIG. 10B).

In another example, multiple 5-of-a-Kinds and/or trips across the reels will continue to "level up" the actor until they trigger a bonus round (or boss level). In another example, a bonus may be a combination of the Actor moving and a bonus element appearing on the later reels. For example, a boss symbol on reel 5 may present an on screen pick that adds wilds to the last two reels (FIG. 11B).

In another example, the system and/or method may utilize symbol substitution. In this example, the symbols land on various areas of the matrix and a partially completed terrain platform appears (e.g., on a 3 of a kind). The Actor moves to the end then interacts with symbols in the next reel(s) and interacting with them in a way to create a bigger win.

In another example, one variety of game play may be to destroy the neighboring symbols and turn them into credits (or other awards). In another example, one variety of game play may be to convert the symbols to a like symbol, creating a four or five of a kind out of a 3 of a kind and extending the terrain on which the Actor can move. In another example, one variety of game play may be to convert the symbols into WILD symbols, creating more pays overall and allowing the Actor to move further across. In another example, one variety of game play may be to manipulate the position of symbols to create a bigger win. In another example, one variety of game play may be to deploy a device that allows the Actor to complete their move across the reels without modifying the win but still triggering the events that normally require the Actor to move all the way across the reels.

In one embodiment, the system and/or method may pause interaction. In this example, the actor may appear on a partially complete terrain platform (e.g., a 3 of a kind) and be presented with options (e.g., a pick, a tool, a target, etc.) which may succeed or fail in doing the symbol substitution described above.

In another embodiment, the system and/or method may utilize a skill-based platform game. In this example, a fully interactive version where the player is actually controlling the Actor. The player uses a game controller to move the actor across the screen through obstacles and chart a course through the terrain presented by the winning paylines. In this example, the player manages the pace of the game and makes choices on the fly.

In one embodiment, the electronic gaming device may include a plurality of reels. One or more paylines may be formed on at least a portion of the plurality of reels. The electronic gaming device may include a memory and a processor. The memory may include one or more platform game play structures. The processor may initiate the one or more platform game play structures based on one or more triggering events, a player level and/or a play level.

In one example, the one or more initiated platform game play structures may be based on one or more characteristics of the one or more triggering events, the player level, and/or the play level. In another example, the processor may display a first game event based on the player level and/or the play level. In another example, the first game event may include one or more first game event options which may be based on the player level and/or the play level. In another example, the processor may receive one or more selections relating to the one or more first game event options where the one or more selections relating to the one or more first game event options may be based on the player level and/or the play level. In another example, the processor may display a second game event based on the one or more selections relating to the one or more first game event options. In one example, the second game event may include one or more second game event options which may be based on the player level and/or the play level. In an example, the processor may receive one or more selections relating to the one or more second game event options where the one or more selections relating to the one or more second game event options may be based on at least one of the player level and the play level. In another example, the processor may display a third game event based on the one or more selections relating to the one or more second game event options.

In one embodiment, the method of providing gaming options via an electronic gaming device may include receiving one or more wagers on one or more paylines. The method may include determining one or more triggering events. The method may include displaying one or more platform game play structures based on one or more triggering events, a player level, and/or a play level.

In another example, the method may initiating one or more platform game play structures based on one or more characteristics of the one or more triggering events, the player level, and/or the play level. In another example, the method may include displaying a first game event. In another example, the method may include that the first game event includes one or more first game event options based on the player level and/or the play level. In another example, the method may include receiving one or more selections relating to the one or more first game event options. In one example, the method may include displaying a second game event based on the one or more selections relating to the one or more first game event options and at least one of the player level and the play level. The method may include that the second game event includes one or more second game event options. In an example, the method may include receiving one or more selections relating to the one or more second game event options. In one example, the method may include displaying a third game event based on the one or more selections relating to the one or more second game event options.

In one embodiment, the electronic gaming system may include a server, which includes a server memory and a server processor. The server memory may include one or more platform game play structures. The server processor may initiate the one or more platform game play structures based on a triggering event, a player level, and/or a play level.

In one example, the server processor may display a first game event.

Gaming system may be a "state-based" system. A state-based system stores and maintains the system's current state in a non-volatile memory. Therefore, if a power failure or other malfunction occurs, the gaming system will return to the gaming system's state before the power failure or other malfunction occurred when the gaming system is powered up.

State-based gaming systems may have various functions (e.g., wagering, payline selections, reel selections, game play, bonus game play, evaluation of game play, game play result, steps of graphical representations, etc.) of the game. Each function may define a state. Further, the gaming system may store game histories, which may be utilized to reconstruct previous game plays.

A state-based system is different than a Personal Computer ("PC") because a PC is not a state-based machine. A state-based system has different software and hardware design requirements as compared to a PC system.

The gaming system may include random number generators, authentication procedures, authentication keys, and operating system kernels. These devices, modules, software, and/or procedures may allow a gaming authority to track, verify, supervise, and manage the gaming system's codes and data.

A gaming system may include state-based software architecture, state-based supporting hardware, watchdog timers, voltage monitoring systems, trust memory, gaming system designed communication interfaces, and security monitoring.

For regulatory purposes, the gaming system may be designed to prevent the gaming system's owner from misusing (e.g., cheating) via the gaming system. The gaming system may be designed to be static and monolithic.

In one example, the instructions coded in the gaming system are non-changeable (e.g., static) and are approved by a gaming authority and installation of the codes are supervised by the gaming authority. Any change in the system may require approval from the gaming authority. Further, a gaming system may have a procedure/device to validate the code and prevent the code from being utilized if the code is invalid. The hardware and software configurations are designed to comply with the gaming authorities' requirements.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," and/or "another example" should be considered to mean that the particular features, structures, or characteristics may be combined in one or more examples.

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. An electronic gaming device comprising:
   a plurality of display areas;
   one or more paylines formed on at least a portion of the plurality of display areas;
   a memory, the memory including one or more platform game play structures; and
   a processor configured to initiate the one or more platform game play structures based on one or more triggering events where each platform game play structure includes a platform which is placed on top of one or more symbols located in one or more display areas of the plurality of display areas, the processor configured to display a first segment of the platform which includes a path image where an object moves on the path image.

2. The electronic gaming device of claim 1, wherein the one or more initiated platform game play structures are further based on at least one of one or more characteristics of the one or more triggering events, a player level, and a play level.

3. The electronic gaming device of claim 1, wherein the processor is further configured to display a first game event based on at least one of a player level and a play level.

4. The electronic gaming device of claim 3, wherein the first game event includes one or more first game event options based on at least one of the player level and the play level.

5. The electronic gaming device of claim 4, wherein the processor is further configured to receive one or more selections relating to the one or more first game event options and the one or more selections relating to the one or more first game event options being based on at least one of the player level and the play level.

6. The electronic gaming device of claim 5, wherein the processor is further configured to display a second game event based on the one or more selections relating to the one or more first game event options.

7. The electronic gaming device of claim 6, the second game event includes one or more second game event options based on at least one of the player level and the play level.

8. The electronic gaming device of claim 7, wherein the processor is further configured to receive one or more selections relating to the one or more second game event options and the one or more selections relating to the one or more second game event options being based on at least one of the player level and the play level.

9. The electronic gaming device of claim 8, wherein the processor is further configured to display a third game event based on the one or more selections relating to the one or more second game event options.

10. A method of providing gaming options via an electronic gaming device comprising:
    receiving one or more wagers on one or more paylines;
    determining via one or more processors one or more triggering events; and
    displaying one or more platform game play structures based on one or more triggering events where each platform game play structure includes a platform which is placed on top of one or more symbols located in one or more display areas;
    wherein the displaying step includes: 1) displaying a first segment of the platform; 2) obtaining a first player input; and 3) displaying a second segment of the platform based on the obtained first player input.

11. The method of claim 10, further comprising initiating one or more platform game play structures based on at least one of one or more characteristics of the one or more triggering events, a player level, and a play level.

12. The method of claim 10, further comprising displaying a first game event.

13. The method of claim 12, wherein the first game event includes one or more first game event options based on at least one of the player level and the play level.

14. The method of claim 13, further comprising receiving one or more selections relating to the one or more first game event options.

15. The method of claim 14, further comprising displaying a second game event based on the one or more selections relating to the one or more first game event options and at least one of the player level and the play level.

16. The method of claim 15, wherein the second game event includes one or more second game event options.

17. The method of claim 16, further comprising receiving one or more selections relating to the one or more second game event options.

18. The method of claim 17, further comprising displaying a third game event based on the one or more selections relating to the one or more second game event options.

19. An electronic gaming system comprising:
    a server including a server memory and a server processor, the server memory including one or more platform game play structures; and
    the server processor configured to initiate the one or more platform game play structures based on a triggering event where each platform game play structure includes a platform which is placed on top of one or more symbols located in one or more display areas, the server processor configured to display a first segment of the platform which includes a path image where an object moves on the path image.

20. The electronic gaming system of claim 19, wherein the server processor is further configured to display a first game event.

* * * * *